United States Patent [19]
Cox

[11] Patent Number: 5,703,456
[45] Date of Patent: Dec. 30, 1997

[54] POWER CONVERTER AND CONTROL SYSTEM FOR A MOTOR USING AN INDUCTIVE LOAD AND METHOD OF DOING THE SAME

[75] Inventor: Karmen D. Cox, St. Peters, Mo.

[73] Assignee: Emerson Electric Co., St. Louis, Mo.

[21] Appl. No.: 452,419

[22] Filed: May 26, 1995

[51] Int. Cl.$^6$ .................................................. H02F 7/36
[52] U.S. Cl. ........................ 318/701; 218/254; 218/439; 218/138; 218/696
[58] Field of Search ..................... 318/138, 245, 318/254, 439, 699–813; 363/98, 95, 97, 53, 81, 89, 224, 207, 205

[56] References Cited

U.S. PATENT DOCUMENTS

| | | | |
|---|---|---|---|
| 4,228,387 | 10/1980 | Brown | 318/696 |
| 4,321,518 | 3/1982 | Akamatsu | 318/696 |
| 4,387,326 | 6/1983 | Ray et al. | 318/138 |
| 4,642,543 | 2/1987 | MacMinn | 318/696 |
| 4,684,867 | 8/1987 | Miller et al. | 318/701 |
| 4,736,151 | 4/1988 | Dishner | 323/224 |
| 4,740,738 | 4/1988 | El-Antably et al. | 318/701 |
| 4,855,652 | 8/1989 | Yamashita et al. | 318/268 |
| 4,884,185 | 11/1989 | Hubert | 363/56 |
| 5,072,166 | 12/1991 | Ehsani | 318/696 |
| 5,115,181 | 5/1992 | Sood | 318/701 |
| 5,187,427 | 2/1993 | Erdman | 363/98 |
| 5,231,342 | 7/1993 | Bahn | 318/696 |
| 5,235,504 | 8/1993 | Sood | 363/53 |
| 5,291,106 | 3/1994 | Murty et al. | 318/375 |
| 5,319,297 | 6/1994 | Bahn | 318/701 |
| 5,355,069 | 10/1994 | Bahn | 318/701 |
| 5,373,195 | 12/1994 | De Doncker et al. | 323/271 |
| 5,373,223 | 12/1994 | Akagi et al. | 318/722 |
| 5,376,867 | 12/1994 | Capetti | 318/376 |
| 5,449,993 | 9/1995 | Davis | 318/701 |
| 5,463,299 | 10/1995 | Futami et al. | 318/618 |

FOREIGN PATENT DOCUMENTS

| | | |
|---|---|---|
| 0573198A1 | 5/1993 | European Pat. Off. |
| 03003699 | 1/1991 | Japan |
| 04281390 | 10/1992 | Japan |

OTHER PUBLICATIONS

Vukosavic and Stefanovic Article SRM Inverter Topologies: A Comparative Evaluation, IEEE Transactions on Industry Applications, vol. 27, No. 6, Nov./Dec. 1991.

Miller, Switched Reluctance Drives pp. 3–69.

Stephenson and Blake, The Characteristics, Design and Applications of Switched Reluctance Motors and Drives, pp. 1–68.

*Primary Examiner*—Paul Ip
*Attorney, Agent, or Firm*—Arnold, White & Durkee

[57] ABSTRACT

A power converter and controller system for a motor using an inductive load, such as a switched reluctance motor, which provides enhanced motor performance. The improved power converter and controller system accomplishes this by using a return bus having a storage device for storing energy. A controller monitors both the in the inductive load and the energy stored in the storage device and dynamically controls the storage device and the inductive load to dynamically control the current in the inductive load and the voltage on the storage device.

41 Claims, 13 Drawing Sheets

POWER CONVERTER AND CONTROL SYSTEM FOR A MOTOR USING AN INDUCTIVE LOAD AND METHOD OF DOING THE SAME

FIELD OF THE INVENTION

The present invention generally relates to a power converter and control system for a motor using an inductive load, such as a switched reluctance motor. More particularly, the present invention relates to an improved power converter and control system which dynamically controls the current passing through the inductive load and the voltage level of a storage device connected to the inductive load to enhance the performance and operating characteristics of the motor.

BACKGROUND OF THE INVENTION

Switched reluctance motors can be used in a wide range of applications. For example, as a fractional or low horsepower (1–3 hp) motor, switched reluctance motors can be used in consumer appliances, such as washing machines, air conditioners, refrigerators and vacuum cleaners. In other applications, switched reluctance motors can be used in drills, heating, ventilation and air conditioning systems, and to control the pen on a plotter used to draw computer generated graphs, drawings, etc. In applications requiring greater horsepower, switched reluctance motors are used to operate industrial pumps, to raise and lower elevators, etc. Many of these applications are also performed by universal, induction, or permanent magnet (PM) motors.

Switched reluctance motors conventionally include a rotor having non-wound rotor poles and a stator having one or more windings (N-windings) on opposite stator poles. A motor winding corresponds to a motor phase. N-winding switched reluctance motors, whether single phase or multi-phase, typically employ a power converter. For example, in a three-phase motor, the conventional converter requires two terminal connections per motor winding. Further, the converter requires solid state devices to provide electrical energy to the windings. Certain of these solid state devices are diodes, a number of which are connected to form a diode bridge circuit which, in combination with a typically large capacitor used in the converter, yields a relatively poor power factor. The capacitor may use a precharge circuit, and the diode bridge may need a high surge rating to protect against diode failure.

The power converter applies electrical energy across the phase windings of the motor under the control of a controller. The controller, which can include a microprocessor or Application Specific Integrated Circuit (ASIC), senses or monitors various operating parameters (motor speed, rotor shaft position, torque settings, etc.) and provides control signals to the power converter. Using the control signals at predetermined times during the phase energization intervals for the windings to switch between the voltage levels provided by the power converter across the motor windings, the controller controls the current flow to the motor windings. Torque is developed in the motor by the tendency for the magnetic circuit to adopt a configuration of minimum reluctance for an opposing pair of rotor poles to be pulled into alignment with an excited winding. By switching the motor windings in the appropriate sequence, the rotor will continuously rotate in either direction so that torque is developed continuously in the appropriate direction.

Basic operating and design characteristics of switched reluctance motors are described in a paper by T. J. E. Miller entitled SWITCHED RELUCTANCE DRIVES and presented at the PCIM conference in 1988. Miller describes a variety of control circuits by which a switched reluctance motor switches from one operating condition to another depending upon the desired operating characteristics of the motor. Other converter and control topologies are set out in Vukosavic and Stefanovic, SRM INVERTER TOPOLOGIES: A COMPARATIVE EVALUATION, IEEE TRANSACTIONS ON INDUSTRIAL APPLICATIONS, Vol. 27, No. 4, November/December 1991, and additional converter and control systems are described in U.S. Pat. No. 5,155,181 to Sood and U.S. patent application Ser. No. 08/175,562, both of which are assigned to Emerson Electric Co., St. Louis, Mo.

These converter and control systems initiate current flow to the windings. Some converter and control systems allow for the transfer of energy to a capacitor at the end of winding activation. For example, the classic inverter using two switching devices per phase winding, the Bifilar and Split-link 1N configurations using one switching device per phase winding, and the Miller and Buck-boost N+1 configurations employ energy transfer to a line filter capacitor, which is a large capacitor capable of maintaining voltage at a level near the peak of the line voltage and supplying current during zero crossings of a single phase AC line.

The C-dump configuration typically employs a large second capacitor that is charged to twice the voltage of the line filter capacitor to have equal magnetizing and demagnetizing voltages. The line filter capacitor supplies the magnetization current to the current winding during the energization interval for the current phase. The second capacitor receives energy only at the end of the energization interval and discharges through an additional switching device at the beginning of the energization interval for the next phase, thereby converting demagnetization energy from the current phase to magnetization energy for the next phase.

The Sood inverter operates in a manner similar to the C-dump except the second capacitor can be small enough that demagnetization is accomplished at an accelerated rate. Consequently, at the time of discharge, the second capacitor voltage can be more than twice the line voltage, and by simultaneously energizing the additional switching device, the rate of magnetization of the next phase is increased. As with the C-dump inverter, however, the second capacitor of the Sood inverter is only charged with demagnetization energy at the end of a phase energization interval.

There are several drawbacks with many current converter and controller systems. For instance, systems that can only charge the capacitor with the energy available at the end of a phase winding energization interval cannot provide expeditious energy transfer at other times during the phase winding energization interval. These systems cannot transfer more energy than provided by the average energy available at the end of the phase energization interval.

Additionally, power converter and controller systems that require large capacitors across the rectified AC line experience a limited range of usage and have a relatively poor power factor because the converter draws current only when the AC line voltage is near its peak. This results in third harmonic currents reflected back on the power lines and inefficient use of power from the power lines. This occurs for both single and multi-phase power converter systems.

Current converter and control systems experience degradation of motor efficiency due to various loss effects. For example, prior controllers fail to minimize iron losses which degrade motor efficiency. Iron losses are a function of both the rate of change of flux and the flux density in the poles of the rotor and stator. These, in turn, are a function of current flow in the windings, but the current converter and control structures do not provide sufficient control over pole current at the appropriate time in a phase energization interval to minimize iron losses.

Many current power converter and control systems use costly electronics and sensors. For example, some converter and control systems rely on large capacitors which are relatively expensive.

Thus, a need exists for an improved power converter and controller system for a motor using an inductive load which provides enhanced and efficient motor operation and eliminates or reduces the drawbacks of current power converter and controller systems.

SUMMARY OF THE INVENTION

The present invention involves a power converter and controller system for a motor using an inductive load, such as a switched reluctance motor, which provides enhanced motor performance reducing the drawbacks of the prior art. The improved power converter and controller system accomplishes this by using a storage device connected to a return bus for dynamically transferring energy between the inductive load and the storage device as determined by a controller. The energy transfer is dynamic because the controller initiates the energy transfer at any time depending on certain operating parameters, such as the current in the inductive load and the energy stored in the storage device. The controller performs the dynamic energy transfer by causing the dynamic switching of voltage levels across the inductive load and operating the converter as a boost inverter for the storage device at the appropriate times. To accomplish this, the controller monitors both the current in the inductive load and the energy stored in the storage device and dynamically controls the return bus to transfer energy between the storage device and the inductive load.

In accordance with a particular embodiment of the present invention, the power converter and control system is for a switched reluctance motor having N windings. Each of the windings has a first end, a second end, and the power converter has a supply bus electrically coupled to the first end of each of the N windings and a common bus electrically coupled to the second end of each of the windings. The power converter also includes a return bus electrically coupled to the windings, and a storage device is electrically coupled to the return bus for storing energy. The controller dynamically controls current in the windings by activating a first set of control signals associated with the windings in coordination with a second control signal for the return bus. As such, the controller dynamically switches the voltage levels across the windings. The term "electrically coupled" is used to signify that the structures are directly coupled or intervening devices, such as diodes or transistors, can exist between the electrically coupled structures.

More specifically, the controller controls the energization of the windings with the first set of control signals and controls the return bus with the second control signal. By activating the return bus with the second control signal, the controller makes the energy stored in the storage device available to the windings. The controller monitors both the phase currents for the windings and the energy stored in the storage device and dynamically controls both the energy in the storage device and the phase currents in the windings. The controller does this by dynamically transferring energy between the storage device and the windings. The controller controls the dynamic transfer of energy by controlling both the activation/deactivation of the windings and the activation/deactivation of the return bus depending on the phase currents of the windings and the energy stored in the storage device. If the energy available from the power line is insufficient for the motor at a particular portion of the phase energization interval, the controller can instantly activate the return bus to dynamically transfer energy from the storage device to the motor until operating conditions dictate otherwise. If the energy available from the power line is sufficient for the motor and the energy level of the storage device is low at a particular instant, then the controller can instantly deactivate the return bus to charge the storage device until the operating parameters dictate otherwise.

Accordingly, the improved power converter and controller system of the present invention provides enhanced motor performance and reduces the drawbacks of current converter and controller systems as will be described below.

BRIEF DESCRIPTION OF THE DRAWINGS

Other aspects and advantages of the present invention may become apparent upon reading the following detailed description and upon reference to the drawings in which.

DETAILED DESCRIPTION OF THE PREFERRED EMBODIMENT

An illustrative embodiment of the invention is described below as it might be implemented using the improved power converter and controller system and methodology to create more efficient and improved motor performance. In the interest of clarity, not all features of an actual implementation are described in this specification. It will of course be appreciated that in the development of any such actual implementation (as in any development project), numerous implementation-specific decisions must be made to achieve the developers' specific goals and sub-goals, such as compliance with system- and business-related constraints, which will vary from one implementation to another. Moreover, it will be appreciated that such a development effort might be complex and time-consuming, but would nevertheless be a routine undertaking of device engineering for those of ordinary skill having the benefit of this disclosure.

Figure 1:
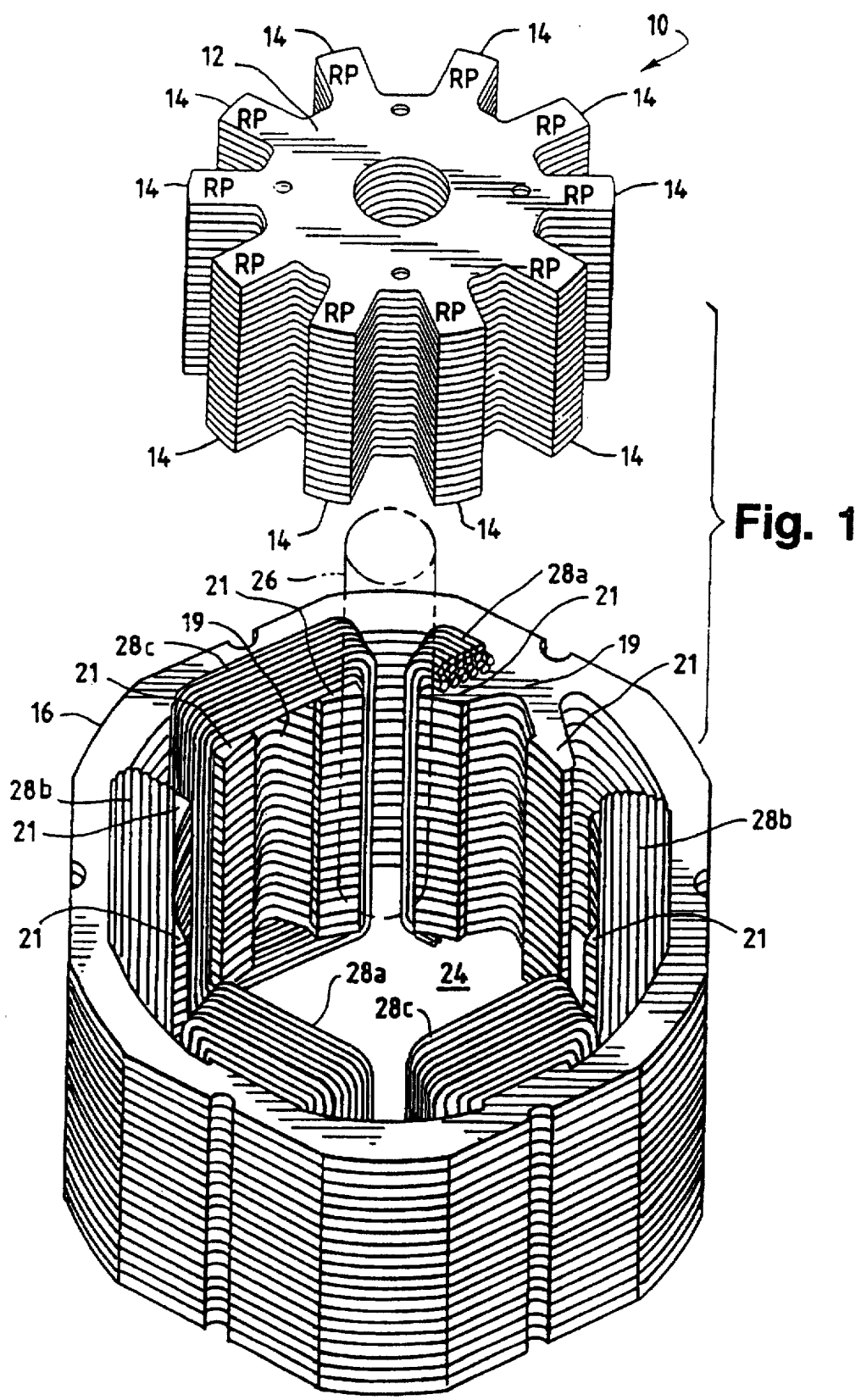
FIG. 1 is a perspective view of a rotor assembly and a stator assembly for a switched reluctance motor which can utilize the power converter and controller system of the present invention.

FIG. 1 shows a switched reluctance motor, indicated generally by reference numeral 10. The switched reluctance motor 10 includes a rotor assembly 12 having a plurality of outwardly salient teeth or rotor poles 14. The switched reluctance motor 10 further includes a stator assembly 16 having a plurality of stator poles 19 having two teeth 21 per pole 19. The stator 16 has a central bore 24 with a diameter slightly greater than the outer diameter of the rotor 12. The rotor assembly 12 is installed within the stator bore 24 on a rotor shaft 26, thereby the rotor assembly 12 can rotate with respect to the stator assembly 16. A plurality of coil or winding sets 28a–c are installed in the stator assembly 16, each set spanning opposite stator poles 19.

The stator assembly 16 uses a split pole arrangement with six stator poles 19 having two teeth 21 per pole 19 as will be recognized by one of ordinary skill in the art. The stator assembly 16 has three phases with two opposite poles per phase or one winding set per phase. Torque is developed in the motor 10 by the tendency for the magnetic circuit to adopt a configuration of minimum reluctance, i.e., for an opposing pair of rotor poles 14 to be pulled into alignment with an excited pair of stator poles 19, maximizing the inductance of the excited coils 28. By energizing the windings in the appropriate sequence, the rotor 12 will continuously rotate in either direction so that torque is developed continuously in the appropriate direction.

Alternatively, as will be understood by one skilled in the art, the switched reluctance motor 10 is specifically described for illustrative purposes, but it should be understood that the power converter and controller system of the present invention can be utilized with motors having different configurations and with a different number of stator and rotor poles.

Figure 2A:
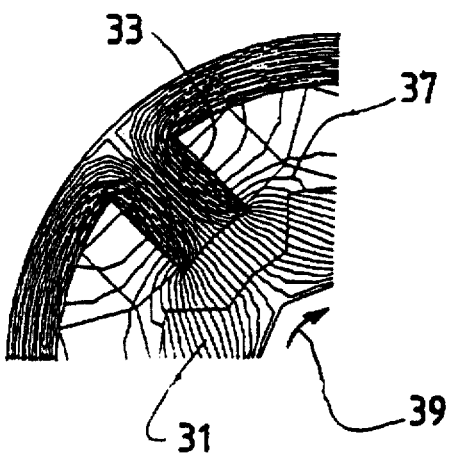
FIGS. 2a–d respectively represent four relative positions of a rotor tooth and stator pole which occur during operation of a switched reluctance motor.

FIGS. 2a–d show four positions of a rotor pole 31 relative to a stator pole 33 and the corresponding flux patterns 37 for the four positions during the operation of a switched reluctance motor. It should be noted that the motor configuration of FIGS. 2a–d is different than the motor configuration of FIG. 1 in that the stator pole 33 only comprises a single outwardly salient tooth 33. FIG. 2a shows the rotor pole 31 approaching the stator tooth 33, and, as indicated by the arrows 39, the rotor assembly is turning clockwise with respect to the stator tooth 33. This position reflects high separation and low induction between the motor pole 31 and the stator tooth 33. As the rotor pole 31 approaches the stator tooth 33, inductance increases, and a positive torque is created. The attractive force between the rotor pole 31 and the stator tooth 33 is a function of both the current magnitude and the position of the rotor pole 31 relative to the stator tooth 33. As such, during this interval, the current supplied to the stator winding (not shown) is controlled to obtain the desired torque. This torque is proportional to the energy transferred to the motor, as self-EMF. Energy is transferred to the load connected to the motor according to the equation, $U=\tau*\omega$ where $\tau$ is torque and $\omega$ is angular velocity.

Figure 2B:
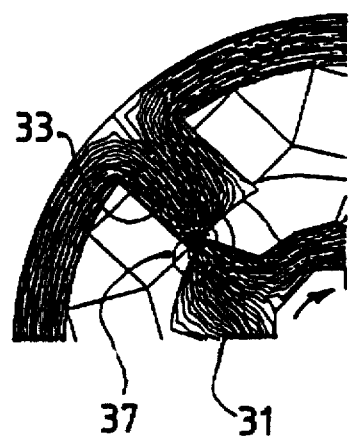

FIG. 2b shows the edge of the rotor pole 31 in close proximity to the edge 43 of the stator tooth 33. As illustrated in FIG. 2b, the flux pattern 37 has been changed from that of FIG. 2a to exhibit a relatively high flux density passing through the edges 41 and 43. FIG. 2b reflects the position of maximum torque and a concentrated flux pattern. At this point, the efficiency of the switched reluctance motor can be adversely affected by iron losses caused by the high flux density. Iron losses are a function of both the rate of change of flux and the flux density in the poles of the rotor and stator. These, in turn, are a function of current flow in the windings. Controlling current in a phase winding (not shown) controls flux density both in the stator tooth 33 and the rotor pole 31. Thus, as will be discussed below, the power converter and controller system of the present invention can minimize iron losses by dynamically and advantageously controlling the current through the winding to reduce iron losses without greatly reducing motor performance, thereby improving motor efficiency.

Figure 2C:
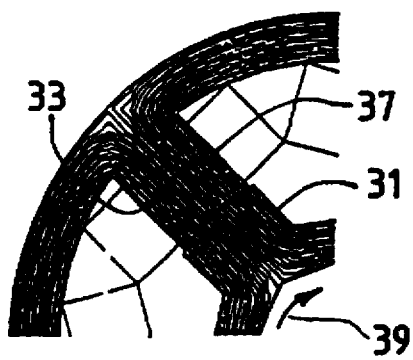

FIG. 2c shows the rotor pole 31 aligned with the stator tooth 33 resulting in maximum inductance and an absence of torque generation. At this point, as will be discussed below, the power converter and controller system of the present invention can dynamically transfer energy from the winding (not shown) to a storage device (not shown), such as a storage capacitor, to advantageously store energy from the winding. The converter and control system can rapidly transfer the energy from the winding to the storage device by switching to a large negative voltage level across the winding at the appropriate time, thereby improving the motor performance.

Figure 2D:
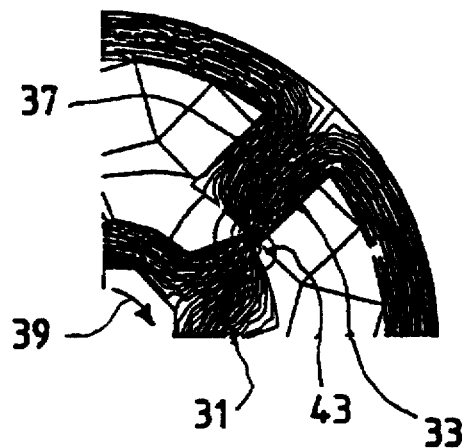

FIG. 2d shows the rotor pole 31 receding from the stator tooth 33 and proceeding to the next stator tooth (not shown). At this stage, inductance is decreasing, and if current is flowing in the stator winding (not shown), a reverse torque is generated. Typically, current flow to this particular winding has been cutoff. If, however, there is current flow, the current can be used to brake the motor. The converter and controller system of the particular embodiment described below dynamically controls the currents through the windings and the storage capacitor and can use the pole 31 as a generator to transfer energy to the storage capacitor or to another phase. In fact, many different events can be simultaneously occurring in the motor using this particular embodiment of the present invention described below because the controller, using the first set of control signals, can control the different phases in a coordinated yet variable manner. For example, while one pole is used to generate torque, another pole can be acting as a generator. Or, a pole can simultaneously generate torque and transfer energy.

Figure 3:
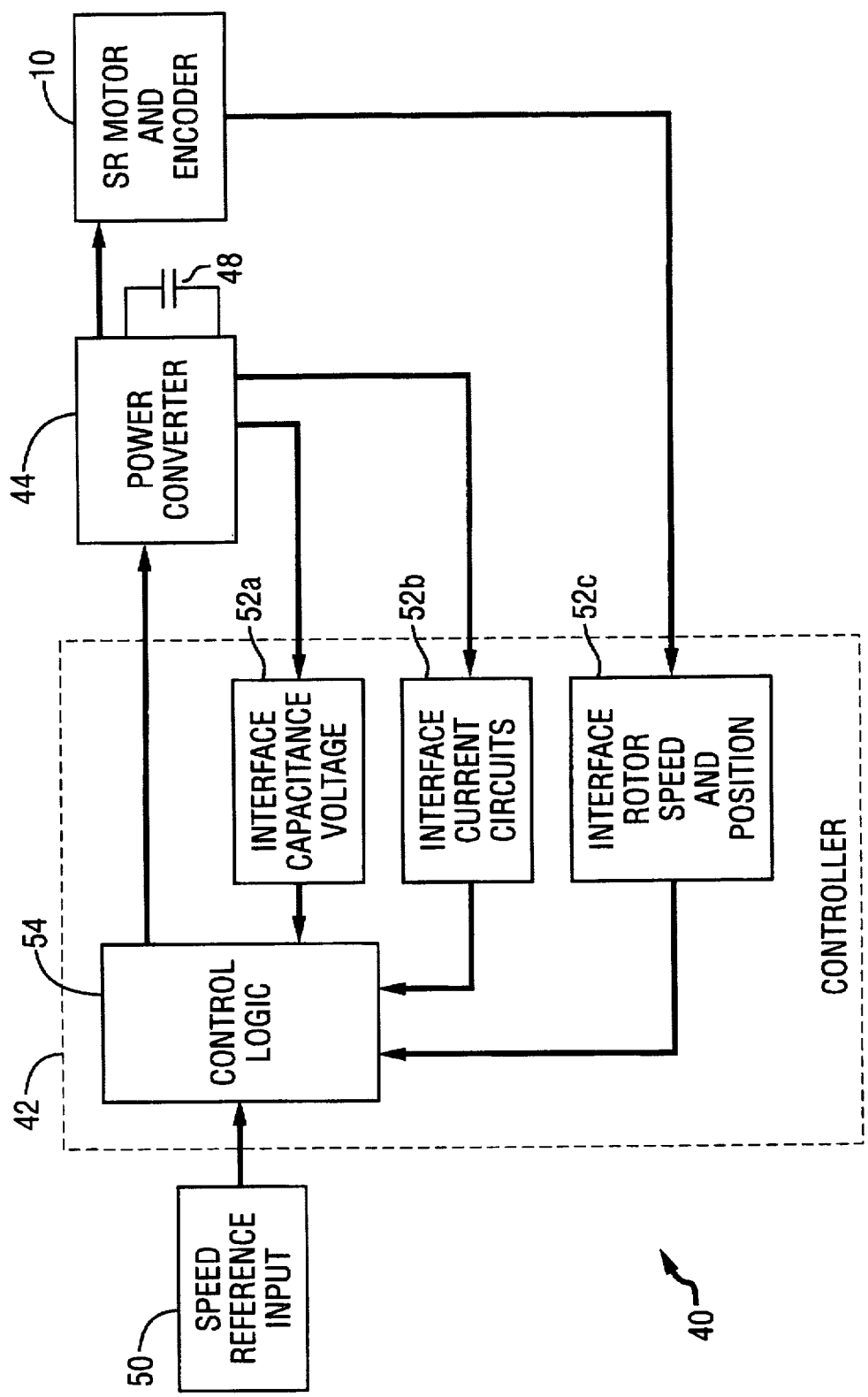
FIG. 3 is a simplified block diagram for a switched reluctance motor system using the power converter and controller system according to the principles of the present invention.

In FIG. 3, a power converter and controller system 40, according to the principles of the present invention, operates a motor 10. A controller 42 monitors various inputs representing various motor operating parameters. A power converter 44 provides the controller 42 with input signals representing the voltage on a storage capacitor 48 and with signals representing current information, including current levels in the windings (not shown). In this particular embodiment, as would be understood by one of skill in the art, the controller 42 receives rotor position and speed information which can be derived using a shaft encoder as a sensor, for example. The controller is additionally supplied with reference inputs, such as desired torque and speed information from an external source 50.

In this particular embodiment, the controller 42 includes interfaces 52a–c, which receive the inputs from the power converter 44 and the motor sensors of the motor 10, for supplying the input information to a control logic 54. The control logic 54 also receives reference information from the external source 50. The control logic 54 continuously monitors and processes the input information and keeps track of the status of the windings (not shown) of the motor 10. In response to these operating conditions, the control logic 54 produces control signals to the power converter 44. These control signals dynamically control the transfer of energy between the windings (not shown) and the storage capacitor 48 by dynamically switching the voltage levels across the windings. Accordingly, the converter and control system of the present invention can dynamically control the phase currents in the windings (not shown) of the motor 10 and the amount of voltage stored in the storage device 48.

Figure 4A:
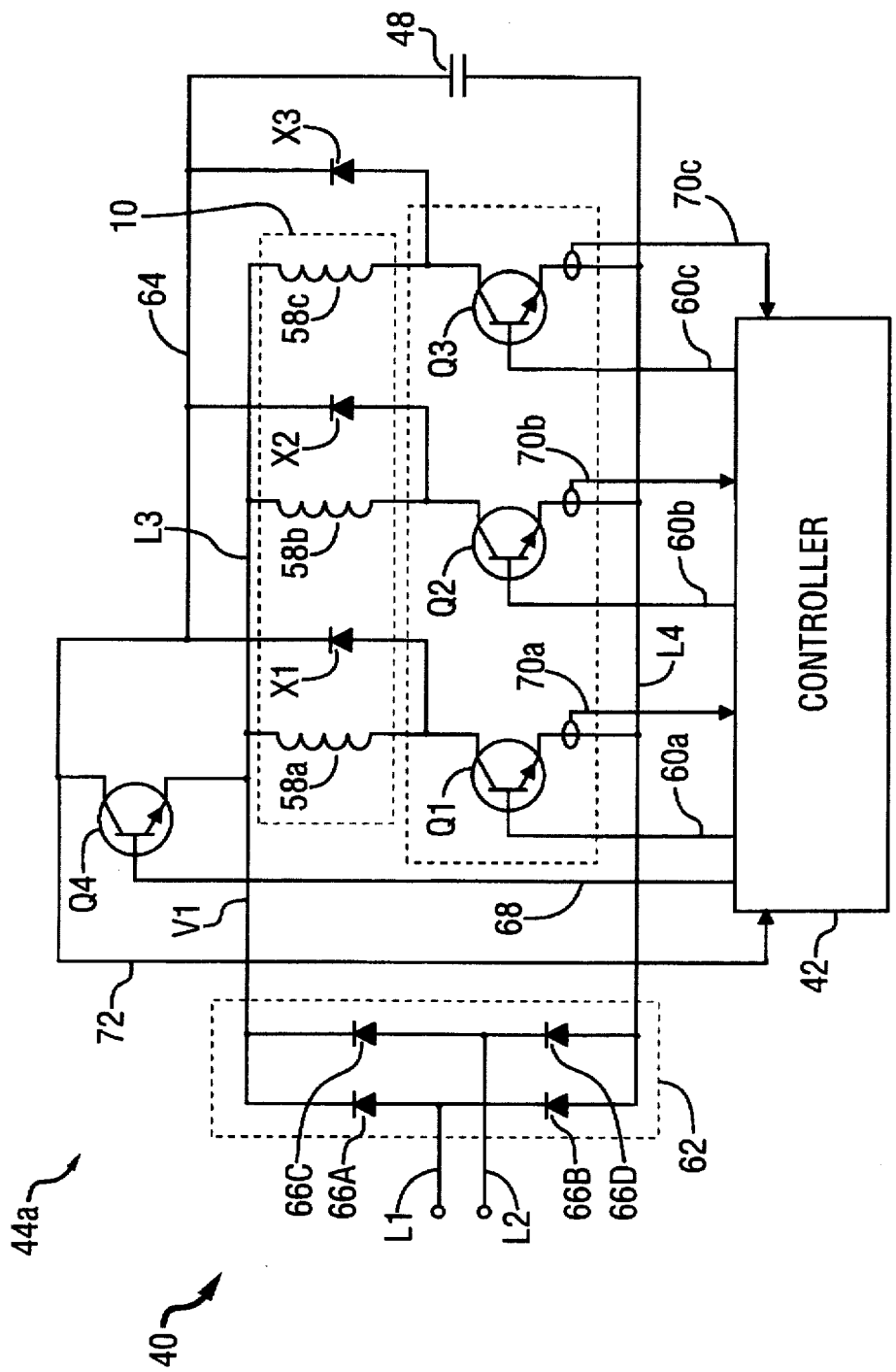
FIGS. 4A and 4b show schematic diagrams for two embodiments of the power converter and control system according to the principles of the present invention.

FIG. 4a shows an embodiment for the power converter 44 of FIG. 3, which is connected to a multiple phase, switched reluctance motor 10 having three sets of windings 58a-c. The power converter 44a switches energy between the windings 58a-c in accordance with the control signals from the controller 42 of FIG. 3. The control signals from the controller 42 are input over lines 60a-c to switches Q1-Q3, which initiate the energization and deenergization of the respective phase windings 58a-c. The converter 44 includes a full-wave rectifier 62 comprising diodes 66a-d. The rectifier 62 is connected to input power lines L1 and L2 from an AC power source (not shown). If the input lines L1 and L2 are from a DC power source (not shown), it will be understood by one of ordinary skill in the art that the rectifier 62 can be replaced with a single diode to separate the DC power source (not shown) from the supply bus L3.

The rectified or undulating DC input is supplied to the windings 58a-c over a supply bus L3 and a common bus L4 during the times when return bus switch Q4 is off. As stated above, the switching devices Q1-Q3 control the supply of energy to the respective phase windings 58a-c according to the control signals provided by the controller 42. The switches Q1-Q3 are connected with their associated phase windings 58a-c, so each switch/winding combination is connected across the supply bus L3 and the common bus L4. Thus, when the switch is activated, a circuit path is completed through the winding to energize the particular phase winding 58a-c with the voltage differential between the supply bus L3 and the common bus L4. During a phase energization period for a particular phase winding 58a-c, the controller 42 can repeatedly activate or deactivate the associated switch Q1-Q3 at any time depending on the changing operating conditions.

Furthermore, during the phase energization period for a particular phase winding 58a-c, the controller 42 can repeatedly activate and deactivate a return bus switch Q4, which is connected between a return bus 64 and the supply bus L3, with a control signal provided over line 68. When the return bus switch Q4 is activated, the return bus 64 supplies energy to the supply bus L3 from the storage device 48 and for the windings 58a-c. When the return bus switch Q4 is deactivated, the storage device 48 is being charged from the windings 58a-c. Diodes X1-X3 are connected between respective second ends of the windings 58a-c and the return bus 64. In this particular embodiment, the storage device 48 is a storage capacitor 48 which is connected to the return bus 64 and the common bus L4. According to the control signals from the controller 42, the switches Q1-Q4 are activated/deactivated in a coordinated manner to provide enhanced motor operation.

The control signals over lines 60a-c control the activation/deactivation of the switches Q1-Q3 for the respective phase windings 58a-c, and the control signal over line 68 controls the activation/deactivation of the return bus switch Q4. The controller 42 monitors the phase currents with lines 70a-70c and the return bus voltage with line 72. By dynamically controlling the switches Q1-Q4, the controller 42 provides dynamic switching of the voltage levels across the windings 58a-c. As a result, the controller 42 controls the dynamic transfer of energy between the windings 58a-c and the storage capacitor 48 to maintain the desired operational conditions, such as the desired phase currents and the desired storage capacitor voltage, for the converter and controller system 40, thereby providing enhanced motor performance. If the energy available from the power line is insufficient at any time, the controller 42 can activate the return bus to transfer energy from the storage capacitor 48 to the supply bus L3 and consequently to the windings 58a-c. If at any time the energy available from the power line is sufficient for the motor and the energy level of the storage capacitor 48 is low, then the controller 42 can deactivate the return bus switch Q4 to charge the storage capacitor 48 from the windings 58a-c. The energy transferred from the windings 58a to the storage capacitor 48 can be the energy stored in a phase winding 58a-c or from a phase winding 58a-c when the converter 44a is operating as a boost inverter.

Figure 4B:
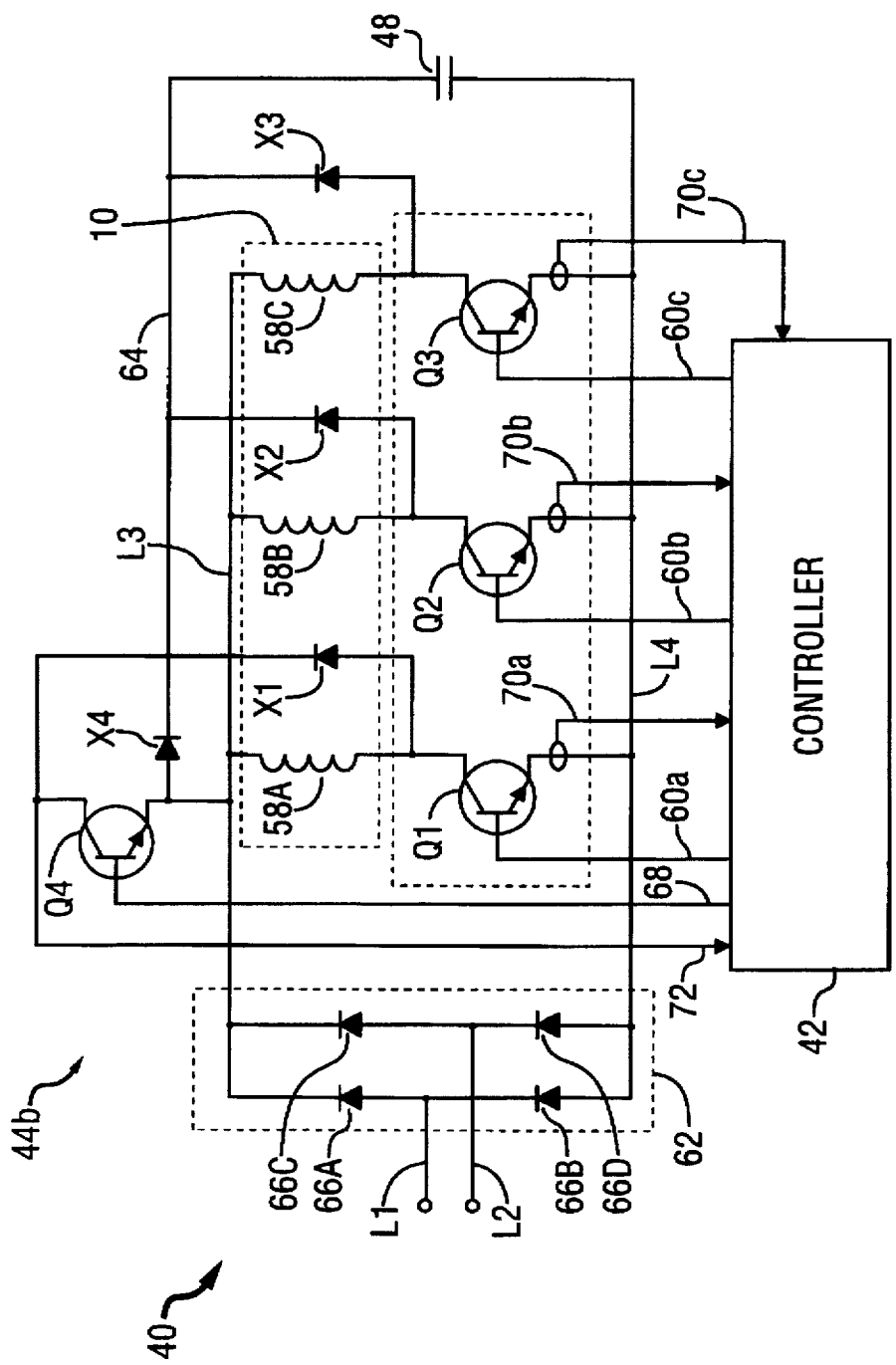

FIG. 4b shows an alternative embodiment for the converter 44 of FIG. 3. The converter 44b has a similar configuration as the converter 44a, except a diode X4 is connected across the supply bus L3 and the return bus 64. The diode X4 prevents the excessive reverse biasing of return bus switch Q4 during power up.

The converters 44a and 44b of FIGS. 4a and 4b are commonly referred to as N+1 circuits because the number of switching devices Q1-Q4 required to control current supply to the respective phase windings 58a-c is equal to the number of motor phases, N, plus 1. The N+1 converters of FIGS. 4a and 4b, however, differ significantly with N+1 configurations previously described. The converter and control system 40 of the present invention dynamically controls the return bus switch Q4 and the switch devices Q1-Q3 of the converters 44a and 44b to dynamically control the current in the windings 58a-c and the voltage level of the storage device 48, thereby enhancing the efficiency and operation of the converters 44a and 44b.

In a typical switched reluctance motor, the electronic controller controls the energization of the windings by switching a unidirectional current sequentially between stator windings. The switching is such that the rotor poles are attracted to the stator poles associated with the energized windings. The attractive force between the rotor and the stator poles is a function of both current magnitude and the position of the rotor pole relative to the stator pole. As is known in the art, current magnitude is controlled or modulated by chopping or switching between various voltage levels.

Previous converter configurations only allow chopping between three voltages, +DC ("on" condition), −DC ("off" condition), and −2 volts due to voltage drops over the diode and transistor ("holding" condition). C-dump configurations also allow only three voltage levels, but chopping only uses two voltages, +DC minus capacitor voltage and −2 volts due to voltage drops over the diode and transistor ("holding" condition). The third voltage is capacitor voltage which is only accessed at the end of a phase energization period. The power converter and controller system 40 of the present invention, however, can dynamically switch between four voltage levels or voltage supplies by dynamically controlling the return bus and the phase energization switches Q1-Q4.

According to the dynamic control provided by the controller 42, the converter 44 of this particular embodiment can dynamically switch between four different voltage levels during one phase energization period or over several phase energization periods. During modulation of a phase current, the controller 42 makes a logical decision based on the current operating conditions of the system. The decision can result in a dynamic switching operation of switches Q1–Q4 at any time which causes a transfer of energy between a phase winding 58a–c and the storage capacitor 48. Energy is drawn from the power line (typically during that portion of a pole passing when energy consumption is low or when the undulating signal provided by the rectifier 62 is high) when the energy available from the power line is greater than the energy required by the motor phase. Conversely, energy is transferred from the storage capacitor 48 to a phase winding 58a–c when energy from the power line is less than the energy required by the phase winding 58a–c such that the phase winding 58a–c can receive energy at a faster rate than would normally be provided by the line voltage.

The four voltage levels that the controller 42 using this particular converter 44 can make available to the windings 58a–c are: 1) the voltage available from the rectifier 62 (minus the voltage drop across the respective switch Q1–Q3); 2) the return bus voltage (minus the voltage drop across the return bus switch Q4 and the voltage drop across the respective switch Q1–Q3); 3) a negative voltage equal in magnitude to the voltage drop across respective diode X1–X3 plus the voltage drop across the return bus switch Q4; and 4) a negative voltage equal in magnitude to the return bus voltage minus the voltage available from the rectifier 62.

The controller 42 dynamically controls the switches Q1–Q3 and the return bus switch Q4 according to a logical decision made at each multiplexing or modulating operation and based on the operating conditions of the system 40 to dynamically switch between the four available voltages to the windings 58a–c. This dynamic switching leads to dynamic control over the voltage level on the storage device 48 and over the currents through the windings 58a–c. This dynamic control occurs throughout one or several phase energization intervals, thereby providing improved motor efficiency and performance. For example, for a phase winding 58a, if the controller 42 activates the switch Q1 and deactivates the switch Q4, the voltage level supplied to the energized winding 58a is the voltage available from the rectifier 62 (minus the voltage drop across the respective switch Q1). The controller initiates this condition to control the return bus voltage on the storage device 48 or the current level in the phase winding 58a by operating the converter 44 as a boost inverter structure. This usually occurs because the voltage level on the storage device 48 is low, and energy is available on the supply bus L3 for charging the storage device 48. The controller 42 monitors the return bus voltage every multiplex cycle, resulting in the control of the average return bus voltage on the storage device 48, but the effort is to control the return bus voltage as well as the phase currents all the time. This operating condition can also occur if a previous phase winding is turning off and charging the storage device 48 and the controller 42 dynamically determines that an increase in energy to the phase winding 58a is desirable.

If the controller 42 deactivates both the switch Q1 and the return bus switch Q4, the voltage level applied to the winding 58a by the converter 44 is the negative voltage equal in magnitude to the return bus voltage minus the voltage available from the rectifier 62. The controller 42 dynamically deactivates the switches Q1 and Q4 usually at the end of the phase energization interval for the phase winding 58a when energy is stored in the phase winding 58a, and the return bus voltage in the storage device 48 is low. As such, the energy from the phase winding 58a is dynamically transferred to the storage device 48 under the control of the controller 42. This also results in the quick decay of the stored energy in the winding 58a because of the generally high negative voltage applied to the winding 58a. Incidently, the higher the voltage level of the storage device 48, the quicker the decay of the energy stored in the winding 58a due to the higher negative voltage across the winding 58a. Additionally, the controller 42 can dynamically deactivate both the switch Q1 and the return bus switch Q4 periodically during the phase energization interval of the phase winding 58a, for example, to reduce iron losses during certain periods of the phase energization interval.

If the controller 42 deactivates the switch Q1 and activates the return bus switch Q4, the voltage level applied to the winding 58a by the converter 44 is the negative voltage equal in magnitude to the voltage drop across the diode X1 plus the voltage drop across the return bus switch Q4. As such, the current in the phase winding 58a recirculates through the diode X1 and the return bus switch Q4, thereby holding current in the phase winding 58a and creating about −2V across the winding 58a from the voltage drops across the diode X1 and the return bus switch Q4. The controller 42 dynamically controls the switches Q1 and Q4 in this manner when the voltage in the storage device 48 and the current in the phase winding are at a sufficient level. In this way, the converter and controller system 40 more efficiently utilizes the available energy between the phase Windings 58a–c. This often occurs in the middle of the phase energization interval for the winding 58a.

If the controller 42 activates both the switch Q1 and the return bus switch Q4, the voltage level applied to the winding 58a by the converter 44 is the return bus voltage (minus the voltage drop across the return bus switch Q4 and the voltage drop across the switch Q1). The controller 42 initiates this state to draw current from the storage device 48 to the phase winding 58a. The controller 42 often does this at the beginning of the phase energization interval for the phase winding 58a to quickly increase the current in the phase winding 58a. Incidently, the voltage level of the storage device 48 is desirably kept at a higher level than the voltage level of the supply bus L3 to provide a quick response and increased current to the phase winding 58a. Additionally, if the phase winding 58a is consuming a lot of energy, the controller 42 can keep the current in the phase winding 58a by activating both switches Q1 and Q4.

The above description involves the various switch configurations for a single phase 58a. The controller 42 dynamically controls the return bus switch Q4 and the switches Q1–Q3 for all the phase windings 58a–c as discussed above to dynamically control the current in the windings 58a–c and the voltage level of the return bus 64. To accomplish this, the controller 42 dynamically monitors the currents of the phase windings 58a–c through monitor lines 70a–c and the voltage level of the storage device 48 through monitor line 72. In addition, the controller 42 keeps track of the switch conditions for all the phase windings 58a–c and the return bus 64. Thus, the controller 42 coordinates the dynamic control of the phase currents and the voltage level of the storage device 48 throughout the phase energization intervals of the phase windings 58a–c to ensure efficient and proper motor operation.

Figure 5:
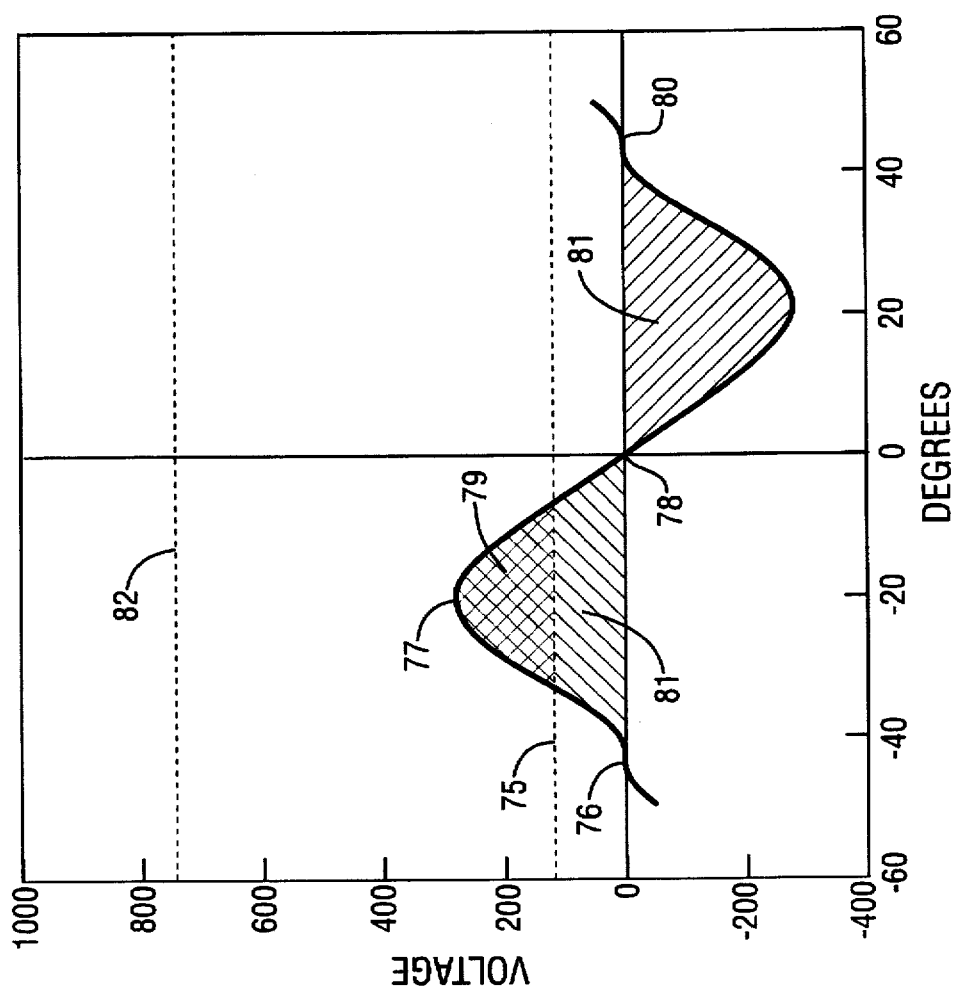
FIG. 5 shows a graph for explaining the dynamic control of the return bus and the phase windings according to the principles of the present invention.

FIG. 5 shows a general graphical representation of the principles behind the converter and control system 40 of FIG. 3, and how the converter and control system 40 (FIG.

3) responds to certain operating conditions in dynamically controlling the energy transfer between a motor winding 58a–c (FIGS. 4a and 4b) and the storage device 48 (FIGS. 4a and 4b) during one pole passing as shown in FIGS. 2a–d. Line 75 represents the energy from the power line L1, L2 assuming a given current and voltage. Line 77 represents the energy consumed by the motor with respect to the pole passing associated with the phase, as self-EMF, at a constant current, voltage and speed, which can be calculated using the equation $\tau*\omega = V*I*2*\pi$, where $\tau$ is torque, $\omega$ is angular velocity, V is the voltage across the phase winding and I is current through the phase winding. This general graphical representation represents a rotor pole 31 passing a stator pole of a switched reluctance motor. Because the passing of a stator pole by a rotor pole typically occurs much quicker than the undulating power source (if source is AC), the line 75 is shown as a straight line. In the graph, the point 76 generally represents the rotor pole approaching the stator pole, but the rotor pole and the stator pole 33 are misaligned (FIG. 2a). The point 78 generally represents when the rotor and stator poles are aligned (FIG. 2c), and point 80 represents when the rotor and stator poles are misaligned after the rotor pole has completely passed the stator pole.

During a pole passing, if the energy consumption line 77 for the motor rises above the available line energy line 75 as shown by area 79, the converter and control system 40 controls the return bus 64 (FIGS. 4a and 4b) and the phase windings 58a–c (FIGS. 4a and 4b) to transfer energy from the storage device 48 (FIGS. 4a and 4b) to the phase winding 58a–c (FIGS. 4a and 4b) because the power line cannot provide the required energy to the phase winding 58a–c. When the energy consumption line 77 dips below the available line energy line 75 as shown by areas 81, the converter and control system 40 controls the return bus 64 and the phase windings 58a–c (FIGS. 4a and 4b) to transfer energy from the phase winding 58a–c to the storage device 48 if the energy level of the storage device 48 is low. This occurs because available energy from the power line is sufficient to satisfy the energy requirement of the motor with respect to the depicted phase, and the energy can be transferred to the storage device 48 (FIGS. 4a and 4b) to dynamically control the voltage level of the return bus 64 (FIGS. 4a and 4b) shown as a constant line 82.

Figure 6:
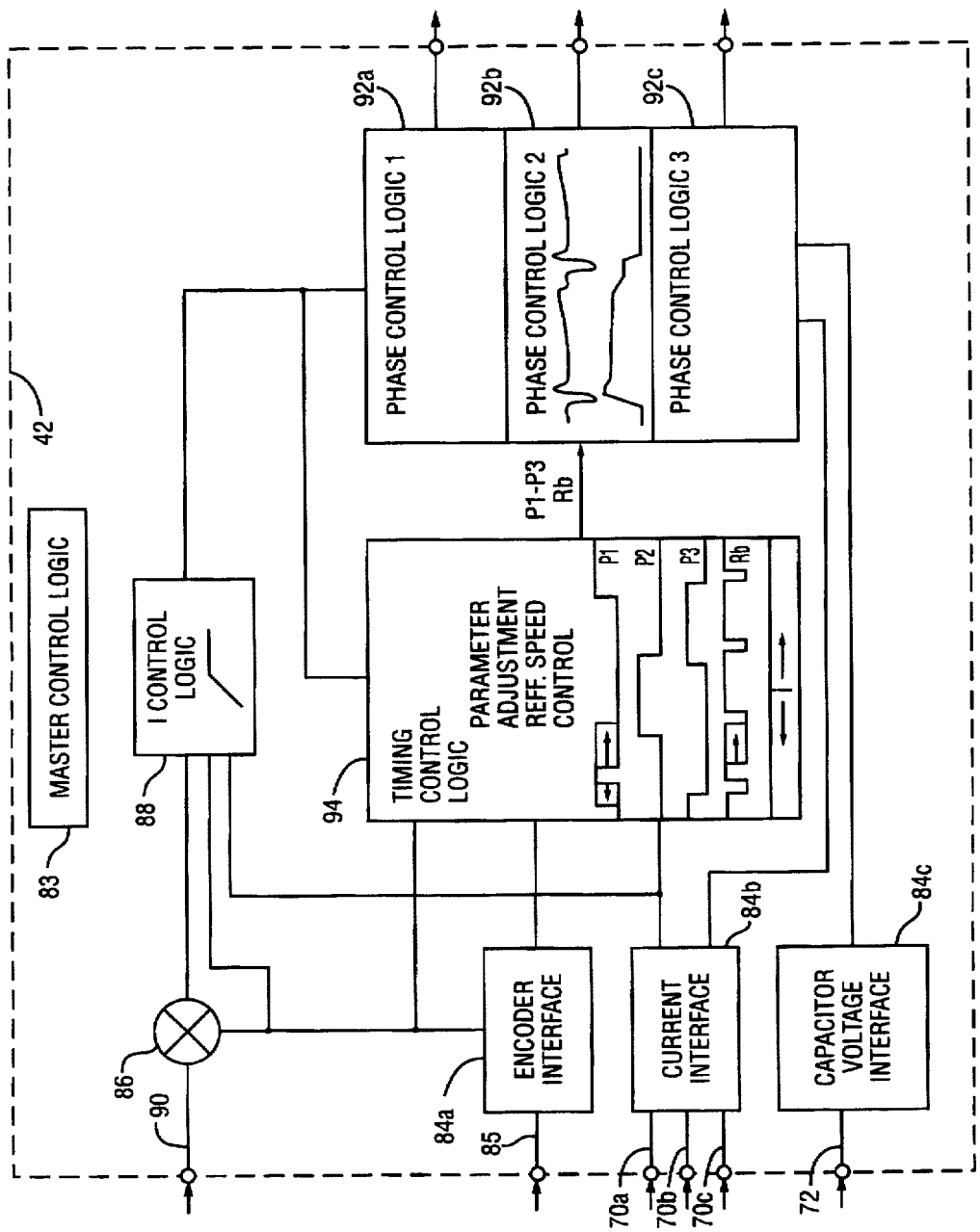
FIG. 6 is an expanded block diagram of a controller according to the principles of the present invention.

FIG. 6 shows a more detailed functional block diagram for an embodiment of the controller 42 of FIG. 3. The controller 42 includes a master control logic block 83 that directs and coordinates the flow of operation for the other functional blocks of the controller 42. In this particular embodiment, the master control logic 83 receives information from all other control blocks, sets control parameters and allows for special functions, such as start-up, stopping, stepping operation of the motor and low power operation of the motor. Additionally, the motor control logic block 83 can perform some of the functions of interface blocks 84a–c. The controller 42 receives various inputs which are used by various logic blocks to dynamically control the currents through the phase windings 58a–c (FIGS. 4a and 4b) and the voltage on the storage device 48 (FIGS. 4a and 4b).

A position interface 84a receives position signals, which identify the rotor position, from a position sensor (not shown). As would be understood by one of skill in the art, different types of position encoder or equivalents can be used. The position interface 84a derives rotor position information and motor speed information from the position signals received over line 85. Alternatively, the master control logic 83 can derive the position and speed information. The speed information from the position interface 84a is received by a comparator 86. The comparator 86 determines whether the motor speed is above or below a reference or desired motor speed signal. In this particular embodiment, the desired speed signal is received by the controller 42 over line 90 from an external device (not shown).

A phase current interface 84b receives phase current signals, which represent the respective currents of the phase windings 58a–c (FIGS. 4a and 4b), over the lines 70a–c and produces phase current information indicative of the current through each phase winding 58a–c. In this particular embodiment, the phase current interface 84b produces a voltage proportional to the current through each switching device Q1–Q3 (FIGS. 4a and 4b).

A current control logic block 88 produces a signal that represents the control current ($I_c$) based on a control algorithm provided by the master control logic 83 and based on motor speed, reference speed and motor current. In this particular embodiment, the current control logic block 88 receives the output of the comparator 86, the speed information from the interface 84a and the phase current information from the phase currents interface 84b. The current control logic block 88 analyzes this information and determines a desired current level for each phase winding 58a–c (FIGS. 4a and 4b) of the motor. The desired current level is updated depending upon the inputs to the current control logic 88 and the mode of operation for the controller 42. A comparison is made between the desired current level and the phase current information received from the interface 84b to determine whether the current level in the phase is above or below the desired current level. Phase control logic blocks 92a–c use the desired current level to control current in each phase winding 58a–c in a coordinated manner.

A timing control logic block 94 receives the speed and positional information from the speed interface 84a, the phase current information from the phase currents interface 84b and the current control information from the current control block 88. The timing control logic block 94 analyzes these inputs and provides phase and return bus timing control signals to the phase control logic blocks 92a–c. In this particular embodiment, the timing control logic 94 produces phase and return bus timing signals (P1, P2, P3, and Rb) received by each of the phase control blocks 92a–c so that the phase control blocks 92a–c can coordinate the dynamic control over their respective phase windings 58a–c to provide improved motor performance. As would be understood by one of skill in the art, additional phase and timing signals can be produced depending on the motor structure and the number of motor phases. For example, in certain embodiments, the timing control logic 94 can produce return bus timing signals Rb1, Rb2 and Rb3 for respective phase control blocks 92a–c. The phase control signals P1–P3 define periods during which a respective phase winding 58a–c should be energized, and the Rb signal determines periods during which the return bus 64 (FIGS. 4a and 4b) should be utilized. According to the dynamic nature of the present invention, the respective phase windings can be energized and deenergized more than once during the respective phase energization periods defined by the respective phase control signals P1–P3. Moreover, the return bus can be activated/deactivated more than once during those periods defined by the Rb signal.

Figure 7:
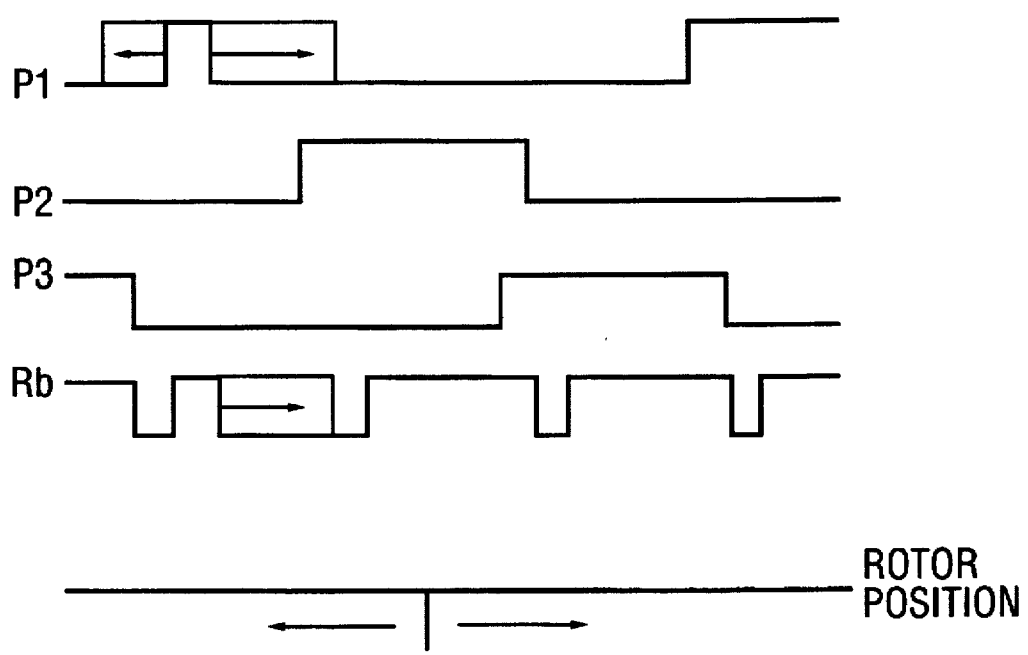
FIG. 7 represents input signals for the phase control logic for a current phase of the controller of FIG. 6.

The timing control logic 94 also controls the duration and sequencing of the phase and return bus timing control signals P1, P2, P3, and Rb as shown in FIG. 7. In FIG. 7, the pulse width of the phase and timing control signals is shown as variable from a minimal value. As such, the duration of the phase energization period for a phase winding is not fixed, but variable in accordance with the sensed motor operating conditions and parameters. Similarly, the duration that the return bus is available (as defined by the control signal Rb) is variable. Phase and timing control parameters are adjusted depending on motor speed, the control current information and the master control block 83. This provides for a wide variation of phase angle delay.

In addition to the signals P1–P3 and Rb, the phase control blocks 92a–c receive various inputs to dynamically control the voltage level of the storage device 48 (FIGS. 4a and 4b) and the currents of the phase windings 58a–c (FIGS. 4a and 4b). The phase control blocks 92a–c receive the phase current information from the phase current interface 84b, the control current information from the current control block 88 and capacitor voltage information from a capacitor voltage interface 84c.

The capacitor voltage interface 84c receives signals, which represent the voltage level on the storage device 48 (FIGS. 4a and 4b), over the line 72 of FIGS. 4a and 4b. In this particular embodiment, the capacitor voltage interface 84c reads a signal proportional to the voltage on the storage device 48 (FIGS. 4a and 4b). The capacitor voltage interface 84c produces the capacitor voltage information for the phase control logic blocks 92a–c. In response to these various input signals, the phase control blocks 92a–c produce power converter control signals to the respective switching devices Q1–Q3 and the return bus switch Q4.

The phase control blocks 92a–c monitor the various input signals and respond to changing input signals by dynamically changing the power converter control signals. In this way, the phase control blocks 92a–c dynamically control the respective switching devices Q1–Q3 (FIG. 4a to 4b) and the return bus switch Q4 with the power converter control signals. As a result, the phase control blocks 92a–c dynamically control the phase currents in the phase windings 58a–c and the voltage level of the storage device 48.

Figure 8A:
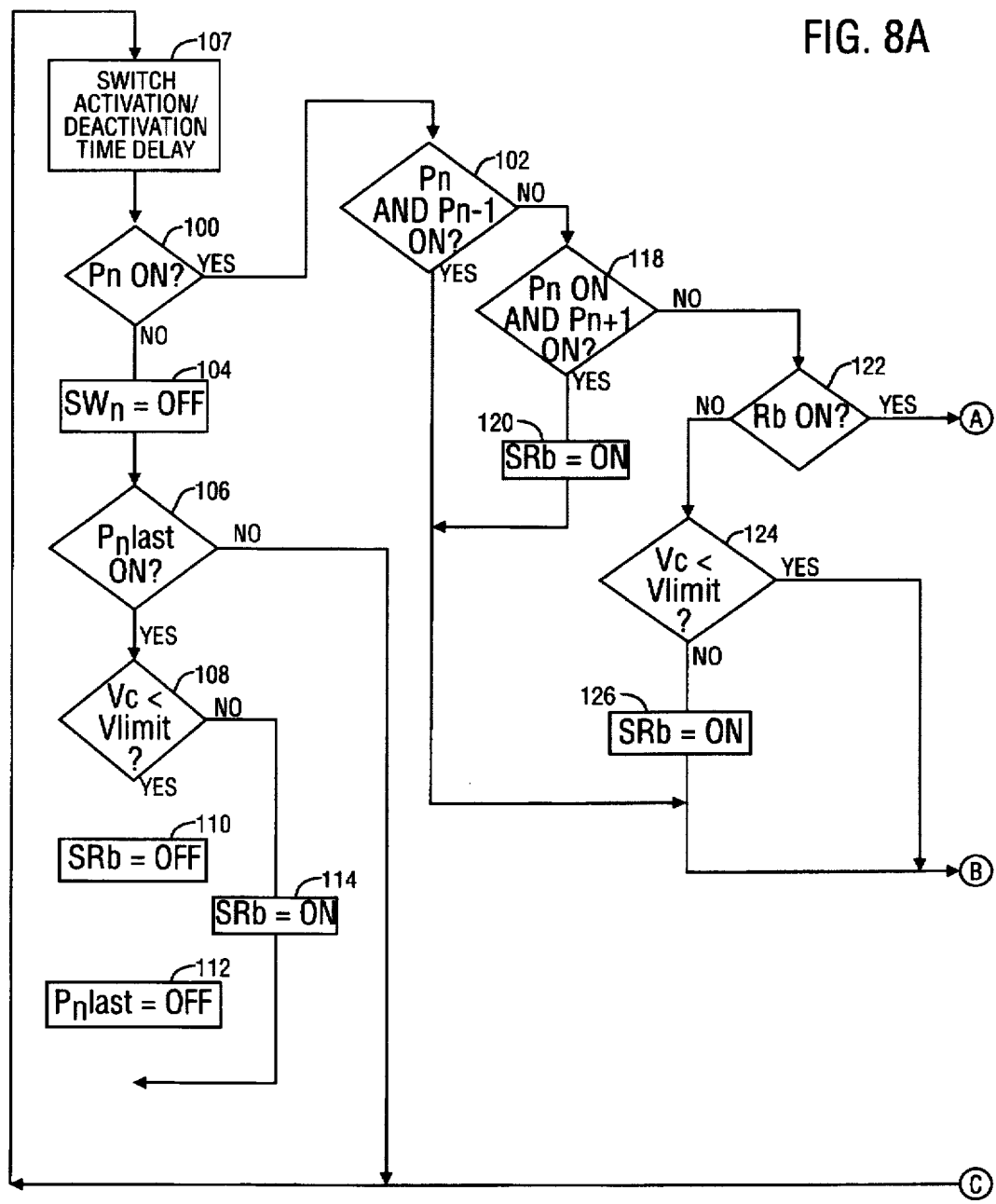
FIGS. 8a and 8b is a flow chart of the operation of the phase control logic for a current phase of the controller of FIG. 6.
Figure 8B:
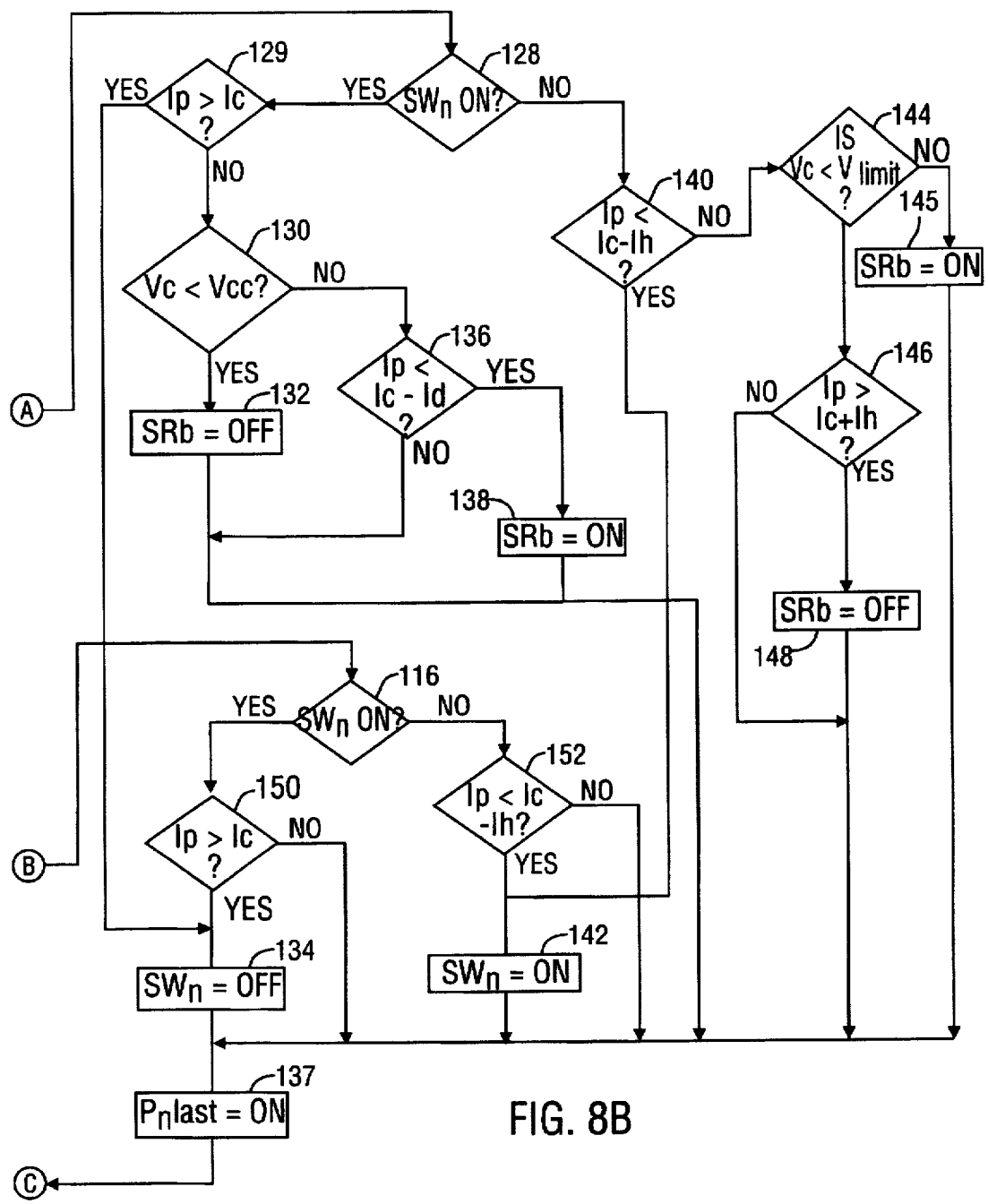

FIGS. 8a and 8b show a flow diagram for a single phase control block n controlling a phase winding n, with power converter control signal $SW_n$ and the return bus switch Q4 with a power converter control signal SRb. In this particular embodiment, the phase control block n corresponds to one of the phase control blocks 92a–c (FIG. 6) which controls one of the phase windings 58a–c (FIGS. 4a and 4b). The phase control block n monitors the phase signals $P_n-1$, $P_n$ and $P_n+1$ from the timing control logic 94. At step 100, if the phase signal $P_n$ for the phase control block n is off, the phase control block n deactivates the switching device $Q_n$ with control signal $SW_n$ for the phase control block n at step 104 and proceeds to step 106. At step 106, the phase control block n determines if a $Pn_{last}$ signal is on. After the Pn signal turns off, the $Pn_{last}$ signal is turned off to signal that the final return bus operation, at least until the Pn signal turns on again, has been performed by the phase control block n. If not, the phase control block n returns to step 100 after experiencing any switch activation/deactivation delays represented by block 107. If so, the phase control block n determines, at step 108, whether the voltage level $V_c$ of the storage device 48 (FIGS. 4a and 4b) is less than $V_{limit}$, which is the maximum desirable voltage level on the storage device 48.

If $V_c$ is less than $V_{limit}$, then the phase control block n deactivates the return bus switch Q4 with the SRb signal at step 110, and the $Pn_{last}$ signal is turned off at step 112. If $V_c$ is greater than or equal to $V_{limit}$, the phase control block n activates the return bus switch Q4, at step 114, by turning the SRb signal on, thereby preventing additional energy from being transferred to the storage device 48. The phase control block n then proceeds to step 100 after passing through any delay 107.

If, at step 100, the phase signal $P_n$ for the phase control block n is on, the phase control block n examines the status of the phase signal $P_n$ and the previous phase signal $P_{n-1}$ at step 102. If phase signals $P_n$ and $P_{n-1}$ are both on at step 102, the phase control block n then proceeds to step 116 for phase energization determinations. If phase signals $P_n$ and $P_{n-1}$ are not both on at step 102, the phase control block n determines whether the phase signal $P_n$ and the next phase signal $P_{n+1}$ are both on at step 118. If the phase signal $P_n$ and the next phase signal $P_{n+1}$ are both on, the return bus switch Q4 is activated at step 120 with control signal SRb to provide the supply bus L3 (FIGS. 4a and 4b) with energy from the storage device 48 (FIGS. 4a and 4b), and the phase control block n then proceeds to step 116 for phase energization determinations.

If the phase signal $P_n$ and the next phase signal $P_{n+1}$ are not both on, then the phase signal $P_n$ is only on, and the phase control block n monitors the Rb signal, which determines whether the return bus should be utilized by the phase winding n, at step 122. If the return bus should not be utilized, the phase control block n checks at step 124 whether the voltage level, $V_c$, of the storage device 48 (FIGS. 4a and 4b) is less than $V_{limit}$. If $V_c$ is greater than or equal to $V_{limit}$, the phase control block n activates the return bus switch Q4 with the SRb signal (contrary to the Rb signal) at step 126 to reduce or maintain the voltage level of the storage device 48 (FIGS. 4a and 4b). The phase control block n proceeds to step 116 to commence phase energization determinations. If $V_c$ is less than or equal to $V_{limit}$, the phase control block n simply proceeds to step 116 to determine whether the switching device $Q_n$ for the current phase n is on by examining the $SW_n$ signal.

At step 116, the phase control block n performs phase energization determinations by examining the $SW_n$ signal to ascertain whether the phase switching device $Q_n$ is on. If so, the phase control block n determines whether the phase current $I_p$ is greater than the control current $I_c$ at step 150. If the phase current $I_p$ is greater than the desired control current $I_c$, the phase control block n deactivates the phase switching device $Q_n$ with $SW_n$ at step 134 to reduce the phase current $I_p$, sets the signal $P_{last}$ to on at step 137 and proceeds to step 100 after any delays 107. If the phase current $I_p$ is less than or equal to the desired phase current $I_c$, the phase control block n sets the signal $Pn_{last}$ to on at step 137 and returns to step 100 after any delays 107.

At step 116, if the phase switching device $Q_n$ is off, the phase control block n determines, at step 152, whether the phase current $I_p$ is less than the control current $I_c$ minus the chopping hysteresis current $I_h$. If so, the phase control logic activates the phase switching device $Q_n$ with the signal $SW_n$ at step 142 to energize the phase winding n and increase the current $I_p$. The phase control block n then sets the signal $Pn_{last}$ to on at step 137 and proceeds to step 100 after any delays 107. If the phase current $I_p$ is greater than or equal to the desired phase current $I_c$ minus the chopping hysteresis current $I_h$, the phase control block n simply sets the signal $Pn_{last}$ to on at step 137 and returns to step 100 after any delays 107.

At step 122, if the Rb signal is on, the phase control block n next determines whether the switching device $Q_n$ for the current phase (n) is on by examining the $SW_n$ signal at step 128. If SW is on, the phase winding n is energized, and the phase control block n proceeds to step 129. At step 129, the phase control block n determines whether $I_p$ is greater than $I_c$. If so, the phase control block n proceeds to step 134 to turn off the switching device $Q_n$ with the $SW_n$ signal, thereby reducing the current $I_p$. The phase control block b then proceeds to step 137 and sets the signal $Pn_{last}$ to on and back to step 100 after any delays 107. If $I_p$ is less than or equal to $I_c$, the phase control block n checks the voltage on the storage device 48 (FIGS. 4a and 4b) at step 130. At step 130, the phase control block n determines whether the voltage level $V_c$ of the storage device 48 (FIGS. 4a and 4b) is less than the minimum desired capacitor voltage $V_{cc}$. If so, the voltage level on the storage device 48 is low. Accordingly, the phase control block n turns the return bus switch Q4 off at step 132 with the SRb signal to charge the storage device 48 (FIGS. 4a and 4b). Afterward, the phase control block n proceeds to step 137 to turn the signal $Pn_{last}$ on and back to step 100 after any delays 107.

At step 130, if the phase control block n determines that $V_c$ is greater than or equal to the minimum desired capacitor voltage $V_{cc}$, the phase control block n proceeds to step 136. At step 136, the phase controller determines whether $I_p$ is less than the desired current through the phase $I_c$ minus a current delta factor $I_d$. If so, the phase control logic block n turns the return bus switch Q4 on with the SRb signal at step 138 to boost the supply bus L3 (FIGS. 4a and 4b) using the storage device 48 because the storage device 48 has sufficient voltage and the phase current $I_p$ is relatively low. The phase control block n then proceeds to step 137 and sets the flag variable $Pn_{last}$ to on and returns to step 100 after any delays 107. If, at step 136, the phase current $I_p$ is greater than or equal to the control current $I_c$ minus the current delta factor $I_d$, the phase control block n then sets the variable $Pn_{last}$ to on at step 137 and returns to step 100 after any delays 107.

If, at step 128, the phase control block n determines that the phase switching device $Q_n$ is off by examining the $SW_n$, signal, the phase control logic block n proceeds to step 140 and determines whether the phase current $I_p$ is less than the desired phase current $I_c$ minus a chopping hysteresis current $I_h$. If so, the phase control block n turns the switching device $Q_n$ on with the $SW_n$ signal at step 142, thereby energizing the phase winding n and drawing more current through the phase winding n.

If, at step 140, the phase control block n determines that the phase current $I_p$ is greater than or equal to the desired phase current $I_c$ minus the chopping hysteresis current $I_h$, the phase control block n proceeds to step 144 and determines whether $V_c$ is greater than $V_{limit}$. If $V_c$ is greater than or equal to $V_{limit}$, the process control block n activates the return bus switch $Q_4$ with the SRb signal at step 145 to reduce the voltage $V_c$. The process control block n then turns the signal $Pn_{last}$ on at step 137 and proceeds to step 100 after any delays 107. If, at step 144, $V_c$ is less than $V_{limit}$, the phase control block n proceeds to step 146 and determines whether the phase current $I_p$ is greater than the desired phase current $I_c$ plus the chopping hysteresis current $I_h$. Incidently, in this particular embodiment the current $I_h$ is involved in step 146 to determine whether the phase current $I_p$ is relatively high, but another value can be substituted for $I_h$ in step 146. If so, the phase current $I_p$ is sufficiently high, and the phase control block n proceeds to step 148 to turn on the return bus switch $Q_4$ with the SRb signal at step 148 to lower the phase current $I_p$ and charge the capacitor 48 (FIGS. 4a and 4b). The phase control block n then sets the signal $Pn_{last}$ to on at step 137 and proceeds to step 100 after any delays 107. If the phase current $I_p$ is less than or equal to the control current $I_c$ plus the current value $I_h$, the phase control block n simply proceeding to step 137 to set the signal $Pn_{last}$ and then to step 100 after any delays 107.

Accordingly, the power converter and control system of the present invention dynamically controls the phase currents of the phase windings 58a–c (FIGS. 4a and 4b) and the voltage level of the storage device 48 (FIGS. 4a and 4b) in a coordinated manner using phase control logic blocks with each block operating according to FIGS. 8a and 8b. This coordinated dynamic control results in a variety of operation modes for the motor, resulting in enhanced motor performance.

One operational mode occurs when a phase winding (referred to here as 58b for discussion purposes) is activated while the previous phase winding (referred to here as 58a) is still activated (FIGS. 4a and 4b). The voltage applied to both phases will be at a high level because the previous phase winding 58a, in this particular mode, has been working as a boost inverter to charge or control the voltage level on the return bus storage device 48 (FIGS. 4a and 4b), such as a storage capacitor. The phase winding 58b reaches its desired current and maintains this current, and the storage device 48 (FIGS. 4a and 4b) is discharged by activating the return bus 64 (FIGS. 4a and 4b) to some lower voltage while providing energy to the phase windings 58a and 58b which are both activated. The previous phase winding 58a is then deactivated as is the return bus 64 (FIGS. 4a and 4b). At this time, energy proportional to the current in the previous phase winding 58a (FIGS. 4a and 4b) transfers to the storage capacitor 48 (FIGS. 4a and 4b), and the phase winding 58b will receive energy from the supply bus L3 (FIGS. 4a and 4b) and not from the storage capacitor 48 (FIGS. 4a and 4b) which is charging. The energy discharged from the previous phase winding 58a to the storage capacitor 48 (FIGS. 4a and 4b) is determined, in part, by the voltage level of the storage capacitor 48 (FIGS. 4a and 4b).

In this particular embodiment, the phase winding 58b is subsequently controlled such that if the current in the phase winding 58b is very low, energy is transferred to the phase winding 58b over the return bus 64 (FIGS. 4a and 4b) from the storage capacitor 48 (FIGS. 4a and 4b). If the current in the phase winding 58b is somewhat low, energy is transferred to the phase winding 58b from the supply bus L3 (FIGS. 4a and 4b). If the current in the phase 58b is high and the capacitor voltage is low, energy is transferred to the storage capacitor 48 (FIGS. 4a and 4b) over the return bus 64 (FIGS. 4a and 4b). Finally, if the current in the phase winding 58b is high and the storage capacitor voltage is high, then the energy (or current) is maintained in the phase winding 58b to be converted to motor rotation.

The operation of the power converter and control system of the present invention further includes several additional modes which lead to improved motor performance. These additional modes include:

1. Operational modes where the return bus voltage is kept high and/or current in the phase windings 58a–c (FIGS. 4a and 4b) is not allowed to go below a certain value. Keeping the return bus voltage high assists in rapid boosting of phase current when the supply bus has a low energy level, and improves the decay time for energy stored in a phase winding. "Floating the bubble" occurs any time when some minimal current is maintained in the phase windings via a lack of demagnetization time regardless of the condition of $V_c$. The current is maintained in the phase winding to partially saturate the iron, thereby producing lower motor inductance.

2. An operational mode where the return bus voltage is not controlled to a high voltage.

3. An operational mode where a phase winding is activated at a time when its inductance and torque are low. This is accomplished primarily to store energy in that phase winding to be later transferred to the storage capacitor.

4. An operational mode where only one phase is on at a time, but the return bus voltage is still controlled as described above.

5. An operational mode where only one phase is on at a time, and the storage capacitor is charged at the end of the activation time for a given phase winding and discharged during the activation of the next phase winding. The return bus voltage is kept low, and the duration of the activation time may be short for minimum noise.

6. An operational mode involving a braking function which can be implemented by not allowing energy to charge the storage capacitor and by assuring a minimum current for all phase windings. Moreover, the timing of the phase currents is controlled to create a reverse torque.

7. An operational mode where the current in a phase is transferred to the storage capacitor over a period of time not just at the end of the normal activation time for the phase.

Thus, by dynamically controlling the activation/deactivation of the phase windings and the activation/deactivation of the return bus, the power converter and control system of the present invention is flexible by providing a variety of operational modes to provide efficient motor operation in a variety of applications and conditions. Additionally, due to the flexibility and dynamic control of the present invention, additional operating modes are attainable.

Figure 9:
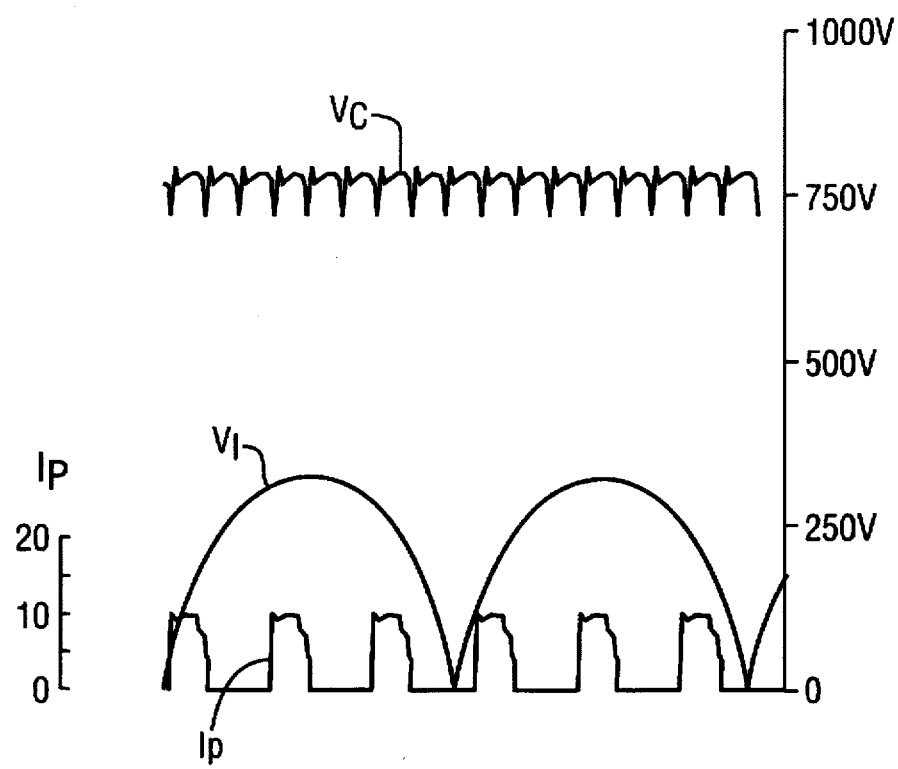
FIG. 9 represents a phase current plotted with line voltage and the voltage level of the storage capacitor of the power converter and controller system of the present invention.

FIG. 9 generally shows example waveforms for the power converter and control system according to the principles of the present invention having an AC source. The input supply voltage $V_i$ is shown as a rectified voltage around 300V. Due to the dynamic control of the phase currents and the return bus provided by the present invention, the power converter and controller system can operate a motor from a wide range of AC and DC voltages including relatively low voltages. The return bus voltage $V_c$ (i.e. the voltage stored in the storage capacitor) is shown as being dynamically controlled to around 750V. The return bus voltage $V_c$ is preferably maintained above the input voltage $V_i$, and the voltage level of the return bus is controlled regardless of the input voltage $V_i$. The phase current $I_p$ for a phase winding is shown in relation to the return bus voltage $V_c$ and the input voltage $V_i$. When the instantaneous AC voltage from the power line is near zero, so little energy is available from the supply bus L3 (FIGS. 4a and 4b), that energy can be advantageously transferred to the supply bus L3 (FIGS. 4a and 4b) from the return bus 64 (FIGS. 4a and 4b).

Figure 10:
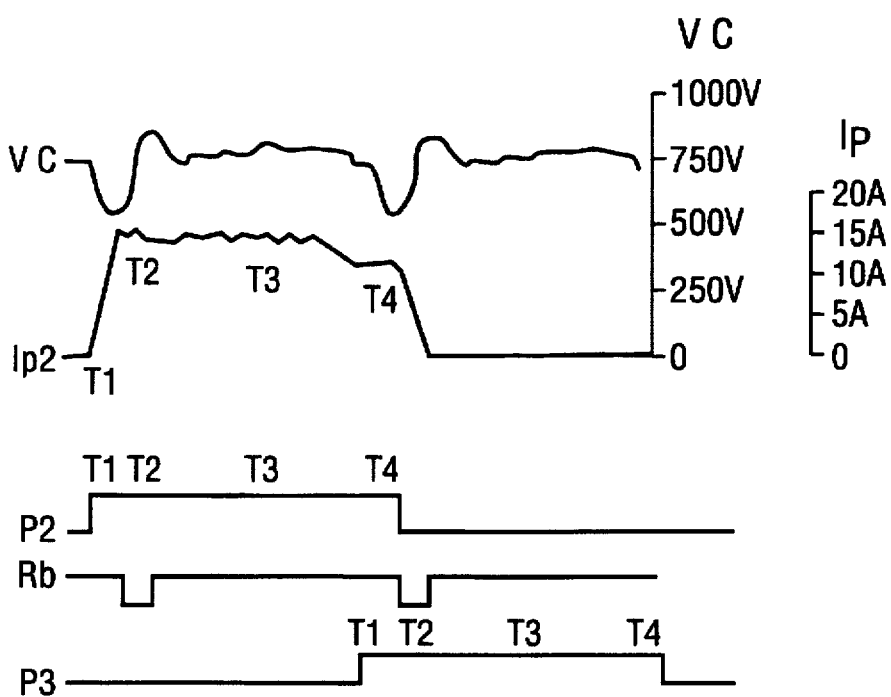
FIG. 10 represents example wave forms in the phase control logic of the controller of FIG. 6.

FIG. 10 shows example control signals P2, P3 and Rb from the timing control block 94 (FIG. 6) together with example waveforms showing the return bus voltage $V_c$ on the storage device 48 (FIGS. 4a and 4b) and the phase current $I_{p2}$ through the phase winding 58b (FIGS. 4a and 4b) during the phase energization interval for the phase winding 58b (FIGS. 4a and 4b) corresponding to the control signal P2. In this particular embodiment, the phase energization interval for the phase windings 58a–c (FIGS. 4a and 4b) can be generally divided into four operating periods which illustrate the dynamic controlling characteristics of the present invention.

At a first operating point designated T1, the phase control logic block 92b (FIG. 6) normally causes current to be drawn from the storage device 48 (FIGS. 4a and 4b) for the phase winding 58b (FIGS. 4a and 4b) to control the current through the phase winding, thereby providing certain features, as follows:

1. $I_{p2}$ can be controlled to a higher level than would normally be needed to run the motor. This higher current then can be subsequently dumped into the storage device 48 (FIGS. 4a and 4b) to maintain a controlled voltage on the storage device 48 (FIGS. 4a and 4b). At high motor speed, this may be the primary means of providing a boost function to control the capacitor voltage $V_c$.

2. The duration of the control signals P1–P3 can be controlled by the timing control logic 94 (FIG. 6) to provide for a particular current $I_{p2}$ without chopping during respective phase energization. This provides for improved motor efficiency.

3. $I_{p2}$ can be controlled to a lower current than would be normally needed to run the motor. This provides for lower current requirement for the Rb switching device. Low Ic during this operating mode can be required at low motor speeds when the motor is heavily loaded.

A second operating point T2 occurs when the control signal Rb is off and the majority of the energy in the previous phase 58a (FIGS. 4a and 4b) will dumped into the storage device 48 (FIGS. 4a and 4b) as shown by the increase in capacitor voltage $V_c$. At a third operating point T3, the phase switching device Q2 as controlled by the $SW_2$ signal (FIGS. 8a and 8b) and the return bus switching device Q4 as controlled by the SRb signal (FIGS. 8a and 8b) will be operated in a manner to control the current in the phase winding 58b (FIGS. 4a and 4b) and to produce a boost inverter feature thereby controlling the voltage $V_c$ on the storage device 48 (FIGS. 4a and 4b). Finally, at a fourth operating point T4, the current $I_{p2}$ can be controlled to provide certain features, as follows:

1. $I_{p2}$ can be controlled to a lower current than would be normally needed to run the motor. This provides for lower current requirement for the return bus switching device Q4.

2. $I_{p2}$ can be controlled to a much lower current than would be normally needed to run the motor. The return bus switching device Q4 would normally be on at this time and the current in the phase winding 58b (FIGS. 4a and 4b) would decrease slowly, thereby providing for quieter operation of the motor.

3. $I_{p2}$ can be controlled to a higher value than normally needed to run the motor. This higher current then can be dumped into the storage device 48 (FIGS. 4a and 4b) maintaining a controlled voltage $V_c$. The timing control logic 94 (FIG. 6) can delay deenergization of the phase winding 58b to provide for some regeneration of the motor rotating energy to be passed to the storage device 48 (FIGS. 4a and 4b) at the T2 or T3 operating points for other phase windings 58a and c (FIGS. 4a and 4b)

Figure 11:
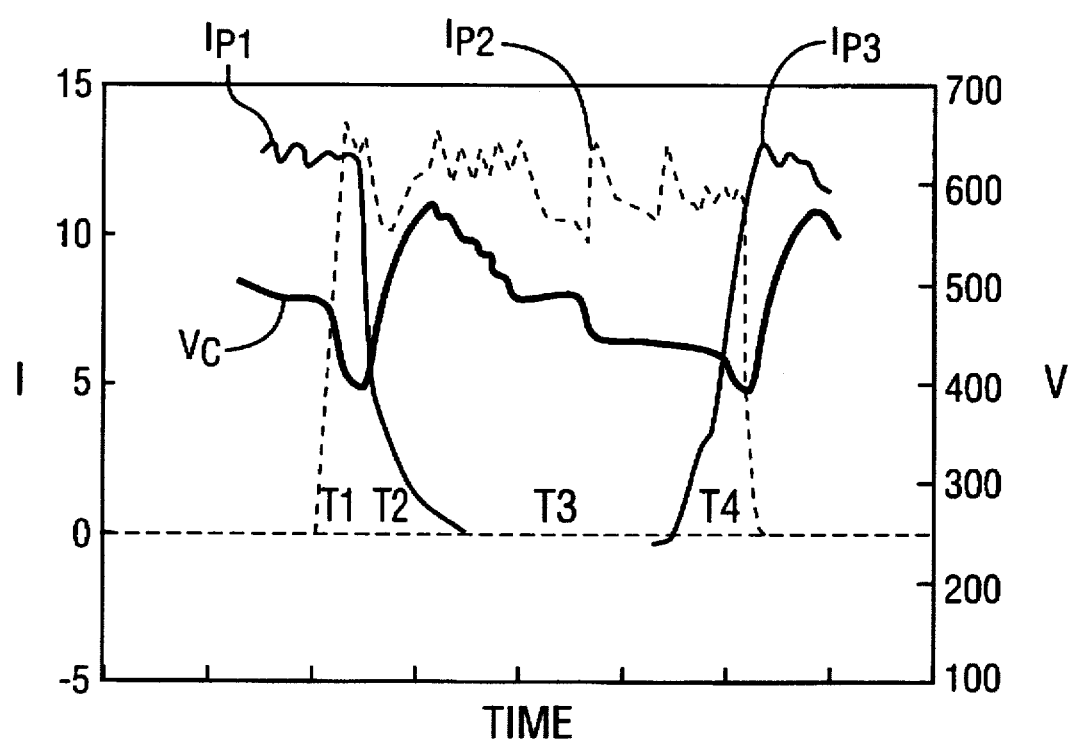
FIG. 11 is a graph illustrating phase currents and capacitor voltage during a phase of motor operation.

FIG. 11 shows example waveforms for the return bus voltage, $V_c$, relative to overlapping phase currents $I_{p1}$, $I_{p2}$ and $I_{p3}$ to illustrate the dynamic control of the phase currents $I_{p1}$, $I_{p2}$ and $I_{p3}$ and the return bus voltage $V_c$. The phase currents $I_{p1}$–$I_{p3}$ are the respective current profiles for each of the three motor phase windings 58a–c (FIGS. 4a and 4b). During the phase energization interval of the phase winding 58b (shown with the operating points T1–T4 discussed above for FIG. 10), the phase currents $I_{p1}$–$I_{p3}$ overlap. As shown with respect to the $V_c$ curve, at the operating point T1 of the phase winding 58b (FIGS. 4a and 4b), the return bus voltage $V_c$ is initially reduced as the charge on the storage capacitor 48 (FIGS. 4a and 4b) is transferred to the supply bus L3 (FIGS. 4a and 4b). This is done to rapidly increase the phase current $I_{p2}$ to a determined value. During the next operating point T2, a portion of the phase current $I_{p1}$ is used to recharge the storage capacitor 48 (FIGS. 4a and 4b).

During the operating period T3, the phase windings 58a–c (FIGS. 4a and 4b) and the return bus 64 are dynamically operated to dynamically control the phase current $I_{p2}$ in the phase winding 58b (FIGS. 4a and 4b) and to control the voltage $V_c$ on the storage capacitor 48 (FIGS. 4a and 4b). As the phase current $I_{p2}$ is chopped, the voltage $V_c$ fluctuates as a function of the motor's self-EMF and the storage capacitor voltage $V_c$. Generally, with regard to the phase winding 58b during a phase energization period and while (FIGS. 4a and 4b) current modulation occurs, if $I_{p2}$ becomes too low due to insufficient energy or voltage available from the power line, energy is drawn from the storage capacitor 48 (FIGS. 4a and 4b). If the current readily available from the power line and the stored energy level of the storage capacitor 48 (FIGS. 4a and 4b) is low, energy is transferred to the storage capacitor 48 (FIGS. 4a and 4b). If both the phase current and stored energy level in the capacitor are high, the phase energy is retained in the phase winding 58b. It will be understood that not all of the available phase energy is converted to motor rotation. Rather, some of the available energy is usable to further boost inverter operations.

Finally, during a operation period T4, the rapidly increasing phase current $I_{p3}$ of the next phase winding 58c (FIGS. 4a and 4b) to be energized again draws down the storage capacitor voltage $V_c$, thereby rapidly increasing the phase current $I_{p3}$ to the desired value for the phase winding 58c.

The waveforms of FIG. 11 are for discussion purposes to explain typical operations which the power converter and controller system of the present invention performs on a single phase winding 58b. At any given time, however, the power converter and controller system can dynamically control the storage capacitor voltage $V_c$ and the phase currents $I_{p1}$–$I_{p3}$ as determined by the controller 42 (FIG. 6).

An important feature of the invention is that by properly controlling the phase switching devices Q1–Q3 (FIGS. 4a and 4b) and the return bus switch $Q_4$ (FIGS. 4a and 4b), the storage capacitor 48 (FIGS. 4a and 4b) can be a small, relatively inexpensive capacitor. The operation of the return bus 64 (FIGS. 4a and 4b) at a voltage substantially higher than the DC voltage on the supply bus L3 enables the usage of a relatively small storage capacitor. Transferring energy at this relatively high voltage to the supply bus L3 from the storage capacitor and to the desired phase winding produces a quicker buildup of phase current Ip than is possible with conventional converter designs, including current N+1 circuit configurations. Similarly, operating the return bus 64 (FIGS. 4a and 4b) at the relatively high voltage produces a quicker current decay rate for the phase winding 58a–c (FIGS. 4a and 4b) at the end of the phase energization interval than is currently possible.

Figure 12:
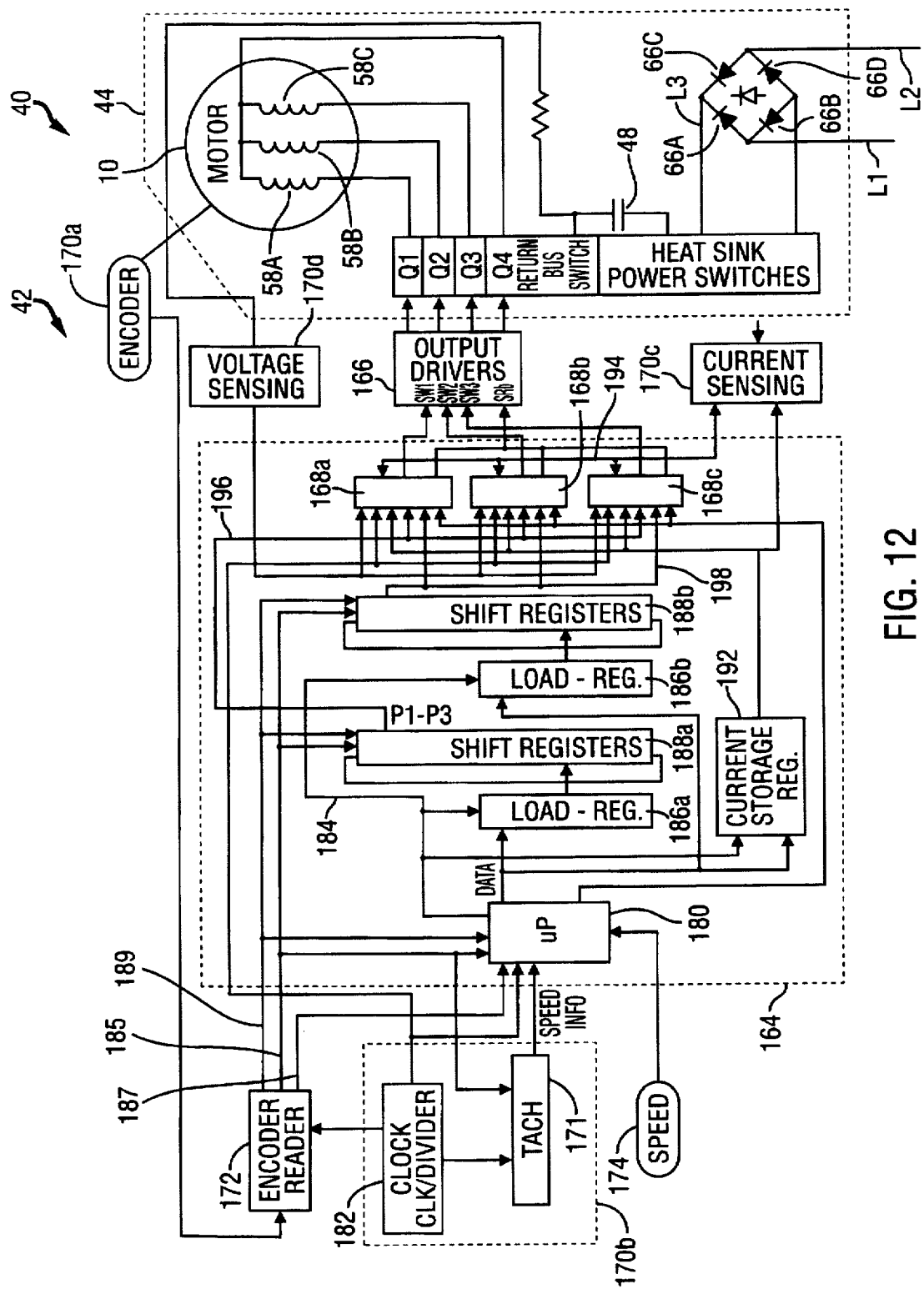
FIG. 12 is a specific embodiment of the power converter and controller system according to the principles of the present invention.

FIG. 12 shows an embodiment for the power converter and controller system 40 according to the principles of the present invention. To implement the various operating modes of motor 10 described above, the converter and control system 40 includes a controller 42 which controls the converter 44 by providing control signals corresponding to the signals SW1, SW2, SW3 and SRb for activating and/or deactivating the switching devices Q1–Q4. In this particular embodiment, switch drivers 166 are output drivers which supply a gate current to the respective switching devices Q1–Q4 according to the control signals SW1, SW2, SW3 and SRb received from phase processors 168a–c.

To develop these control signals, the controller 42 uses sensors 170 to monitor various motor operating parameters.

A processing circuit 164 of the controller 42 processes the sensor outputs and the voltage of the storage capacitor 48 and develops the switch signals SW1–SW3 and SRb for operating the switch drivers 166 to control the respective switches Q1–Q4. In this particular embodiment, the processing circuitry 164 includes a control processor 180, such as a microprocessor or application specific integrated circuit (ASIC), and individual phase processors 168a–c, such as individual microprocessors or individual ASICS. Alternatively, a single ASIC or processor could be used in the processing circuitry 164. In this embodiment, there are three phase processors 168a–c because the motor 10 is a three-phase motor. In addition, the processing circuitry 164 receives a clock signal from a clock/clock divider 182, for which generate a fundamental clock signal as well as clock signals derived from the fundamental clock signal.

The sensors 170 monitor various motor operating parameters. A shaft encoder 170a monitors rotor shaft position by providing position signals which identify the rotor shaft position relative to a defined reference location. When the motor 10 is running, the encoder 170a senses the instantaneous rotor shaft position and transmits the position signals to the encoder reader 172. In a particular embodiment, the encoder 170a provides a quadratured output signal to the encoder reader 172. The resolution provided by the quadratured signals is, for example, 0.72° of rotor rotation per transition of the quadratured signals. The reader 172 also receives clock signals from the clock 182. In processing the position signals from the encoder 170a, the reader 172 produces increment signals on line 185 at each transition of the position signal from the encoder 170a, a direction signal on line 187 and an index signal on line 189.

A speed sensor 170b includes a tachometer 171 which measures motor speed using the increment signal on line 185 from the encoder reader 172 and a clock signal from the clock 182. A speed reference unit 174 provides a reference speed signal supplied by the user as the desired speed. The clock input to the tachometer 171 increments a counter (not shown) within the tachometer 171. The clock inputs counted are those occurring between each transition of the increment signal supplied by the reader 172. The contents of the counter thus represent the length of time required for every increment of shaft rotation. The control processor 180 queries the tachometer 171 to supply motor speed data to the control processor 180 from the contents of the counter. With this information, the control processor 180 calculates motor speed. The control processor 180 also receives the output from the speed reference unit to determine if the motor is operating above or below the desired speed.

Current sensor 170c develops phase current signals as a voltage which is proportional to the current flow through each switching device Q1–Q3. A control current signal from the control processor 180 is routed through a current storage register 192 to the current sensing unit 170c. The binary control current signal representing the desired current level is supplied both to the current sensor 170c and to each phase processor 168a–c. Internal capacitors (not shown) are charged to a voltage proportional to the current Ip in a phase winding 58a–c during its phase energization interval. These capacitors discharge at a rate proportional to the change in current in the respective phase winding 58a–c during phase deenergization. As a result, the capacitor charge voltages are proportional to the current in each motor phase. This voltage is converted to a digital or binary value and compared with a reference value supplied to the sensor 170c by the control processor 180. Other reference voltages representing the desired current level in each phase are also supplied to the current sensor 170c via line 194.

In this particular embodiment, the voltages produced by the current sensor 170c are the phase current signals which represent the currents in the phase windings 58a–c. The phase current signals are compared with these other values to provide an indication of whether the sensed currents are above or below desired phase current levels. The result is available back to each phase processor 168a–c. Additionally, a voltage sensor 170d provides a voltage signal representing the voltage level of the storage capacitor 48 (FIGS. 4a and 4b) to the phase processors 168a–c.

The control processor 180 receives a clock signal from the clock 182, speed information from the speed sensor 170b, the index, increment and direction signals from the encoder reader 172, the speed reference signal from the unit 174 and any communications from the phase processors 168a–c. The control processor 180 processes these input signals and provides control data relating to phase and return bus timing and current control. The control processor 180 includes data steering lines 184 for routing data internally within the processing circuit 164. The processing circuit 164 also includes first and second load registers 186a and 186b and first and second shift registers 188a and 188b through which control data from the control processor 180 is routed to the phase processors 168a–c. Phase timing data is routed through registers 186a and 188a, and bus timing data is routed through registers 186b and 188b.

Using the data steering lines 184, the control processor 180 routes phase timing information to the load register 186a. The index signal on line 189 from the encoder reader 172 causes the phase timing information to be loaded into the shift register 188a, and the increment signal on line 185 from the reader 172 shifts the phase timing information within the shift register 188a. The phase timing information proceeds over phase timing lines 196 to the phase processors 168a–c. Similarly, the control processor 180 routes the return bus information signals into the load register 186b using the data steering lines 184, and the index signal causes the return bus information to be loaded into the shift register 188b. The increment signal from the encoder reader 172 shifts the return bus information within the shift register 188b. The return bus information proceeds over the return bus information lines 198 to the phase processors 168a–c. The return bus information can be a single return bus control signal Rb or three control bus signals Rb1–Rb3 for each phase winding 58a–c (FIGS. 4a and 4b) carried over n return bus information lines 196.

Additionally, the control processor 180 loads the current storage register 192 with the control current using the data steering lines 184. The phase processors 168a–c monitor the phase and return bus timing signals from the shift registers 188a and 188b, current information from the current sensor 170c, the voltage signal from the voltage sensor 170d, the control current in the current storage register, any communications from the control processor 180 and any communication from the other phase processors 168a–c to dynamically control the activation/deactivation of the phase windings 58a–c (FIGS. 4a and 4b) and the activation/deactivation of the return bus 64 (FIGS. 4a and 4b). In this particular embodiment, each phase processor 168a–c processes the above information signals to develop the switch signals SW1–SW3 and SRb which are applied to the switch drivers 166 to activate/deactivate the switching devices Q1–Q4.

The principles of the present invention, which have been disclosed by way of the above examples and discussion, can be implemented using various power converter configurations and arrangements. For example, the embodiment of FIG. 12 is implemented with a control processor 180 and phase processors 168a–c, but the controller of the present invention can be implemented with a single processor. Furthermore, the controller of the present invention can be configured in a variety of manners. Those skilled in the art will readily recognize that various other modifications and changes may be made to the present invention without strictly following the exemplary application illustrated and described herein and without departing from the true spirit and scope of the present invention, which is set forth in the following claims.

What is claimed is:

1. A power converter and control system for a motor having an inductive load, said system comprising:
   a power converter having a supply bus electrically coupled to said inductive load, said supply bus supplying energy to said inductive load, said power converter having a return bus electrically coupled to said inductive load, said return bus electrically coupled to a storage device for storing energy; and
   a controller provides control signals to said power converter, said control signals responsive to operating parameters of the inductive load and the return bus to dynamically activate/deactivate said inductive load.

2. The converter and control system according to claim 1 wherein said controller provides control signals responsive to the operating parameters of the inductive load and the return bus to dynamically control said return bus to dynamically control the energy stored in said storage device and the energy in said inductive load.

3. The power converter and control system according to claim 2 wherein said controller dynamically controls said energy stored in said storage device and said energy in said inductive load by dynamically 1) transferring energy from said storage device over said return bus to said inductive load when said current of to said inductive load is below a determined level and 2) transferring energy from said inductive load to said storage device when a) said energy stored in said storage device is below a second determined level and b) said energy of said inductive load is above a third determined level.

4. The power converter and control system according to claim 1 wherein said machine is a switch reluctance motor and said inductive load is a winding of said motor.

5. The power converter and control system according to claim 1 wherein said machine includes a plurality of windings, each of said windings having a first end, a second end, an energization switch and a current provided by said supply bus according to a control signal received by said energization switch for each of said windings.

6. The power converter and control system according to claim 1 wherein said return storage device is a capacitor.

7. The power converter and control system according to claim 6 wherein said capacitor is a relatively small size capacitor.

8. The power converter and control system according to claim 2 wherein said controller dynamically controls said energy stored in said storage device to a voltage level higher than said supply bus.

9. The power converter and control system according to claim 2 wherein said controller dynamically controls said energy stored in said storage device to a voltage level lower than a predetermined value.

10. The power converter and control system according to claim 2 wherein said controller dynamically controls said energy stored in said storage device by operating said power converter as a boost inverter.

11. A power converter and control system for a switched reluctance motor having N windings, each of said windings having a first end, a second end and an energization switch, said system comprising:

a power converter having a supply bus electrically coupled to said first end of each of said N windings and a common bus electrically coupled to said second end of each of said windings, said supply bus providing phase energies to said windings according to a first set of control signals received by energization switches for said windings, said power converter having a return bus electrically coupled to said windings and said common bus, said return bus having a return storage device for storing energy and a return bus switch; and a controller provides control signals to said power converter, said control signals responsive to operating parameters of the windings and the return bus to dynamically activate/deactivate the energization switches for said windings.

12. The power converter and control system of claim 11 wherein said controller provides control signals responsive to the operating parameters of the windings and the return bus to dynamically control said return bus to dynamically control the energy stored in said storage device and the phase energy for a winding by dynamically switching between voltage levels across said winding.

13. The power converter and control system according to claim 11 wherein said controller dynamically controls said energy stored in said storage device and said phase energy for said winding by dynamically 1) transferring energy from said storage device over said return bus to said winding when said phase energy of said winding is below a determined level and 2) transferring energy from said winding to said storage device when a) said energy stored in said storage device is below a second determined level and b) said phase energy of said winding is above a third determined level.

14. The power converter and control system according to claim 11 wherein said storage device is a capacitor.

15. The power converter and control system according to claim 14 wherein said capacitor is a relatively small size capacitor.

16. The power converter and control system according to claim 11 wherein said controller dynamically controls said energy stored in said storage device to a voltage level higher than said supply bus.

17. The power converter and control system according to claim 11 wherein said controller dynamically controls said energy stored in said storage device to a voltage level lower than a predetermined value.

18. The power converter and control system according to claim 11 wherein said controller dynamically controls said energy stored in said storage device by operating said power converter as a boost inverter.

19. The power converter and control system according to claim 11 wherein said controller dynamically controls phase energy of a winding without pulse-width modulating said energization switch of said winding by dynamically controlling said energization switch depending on said phase energy and said voltage level of said storage device.

20. The power converter and control system according to claim 11 wherein said controller dynamically controls phase energy of a winding above a minimum energy level by invoking a braking function.

21. The power converter and control system according to claim 12 wherein said controller dynamically activates an energization switch for a winding having a low torque and inductance to store energy in said winding for said storage device.

22. A power converter and control methodology for a motor having an inductive load, said methodology comprising the steps of:

providing a power converter having a supply bus electrically coupled to a first end of said inductive load and a common bus electrically coupled to a second end of said inductive load, said supply bus supplying energy to said inductive load according to a control signal received by an energization switch, said power converter having a return bus, said return bus having a storage device for storing energy;

monitoring operating parameters for said inductive load and said return bus; and dynamically activating/deactivating said inductive load in response to said operating parameters of said inductive load and said return bus.

23. The converter and control system methodology according to claim 22 further including the step of:

dynamically controlling said return bus in response to the operating parameters of said inductive load and said return bus to dynamically switch between voltage levels across said inductive load.

24. The power converter and control methodology according to claim 23 wherein said step of dynamically controlling said energy stored in said storage device and said energy in said inductive load further includes the step of:

dynamically transferring energy to said inductive load from said storage device when said energy of said inductive load is below a determined level; and dynamically transferring energy to said storage device from said inductive load when a) said energy stored in said storage device is below a second determined level and b) said energy of said inductive load is above a third determined level.

25. The power converter and control methodology according to claim 22 wherein said step of providing further includes the step of:

employing a switch reluctance motor as said motor and a winding of said motor as said inductive load.

26. The power converter and control methodology according to claim 25 wherein said step of employing further includes the step of:

employing a plurality of windings, each of said windings having a first end, a second end, an energization switch and energy provided by said supply bus according to said control signal received by said energization switch for each of said windings.

27. The power converter and control methodology according to claim 22 wherein said step of providing further includes the step of:

employing a capacitor as said storage device.

28. The power converter and control methodology according to claim 27 wherein said step of employing further includes the step of:

employing a relatively small size capacitor as said storage device.

29. The power converter and control methodology according to claim 23 wherein said step of dynamically controlling further includes the step of:

dynamically controlling said energy stored in said storage device to a voltage level higher than said supply bus.

30. The power converter and control methodology according to claim 23 wherein said step of dynamically controlling further includes the step of:

dynamically controlling said energy stored in said storage device to a voltage level lower than a predetermined value.

31. The power converter and control methodology according to claim 23 wherein said step of dynamically controlling further includes the step of:

dynamically controlling said energy stored in said storage device by operating said power converter as a boost inverter.

32. The power converter and control methodology according to claim 23 wherein said step of dynamically controlling further includes the step of:

dynamically controlling said energy of said inductive load without pulse-width modulating said energization switch by controlling said energization switch depending on said energy and said voltage level of said energy device.

33. A power converter and control methodology for a switched reluctance motor having N windings, each of said windings having a first end, a second end and an energization switch, said methodology comprising the steps of:

providing a power converter having a supply bus electrically coupled to said first end of each of said N windings and a common bus electrically coupled to said second end of each of said windings, said supply bus providing phase energies to said windings according to a first set of control signals received by said energization switches for said windings, said power converter having a return bus, said return bus having a return storage device for storing energy;

monitoring operating parameters for a winding and said return bus; and dynamically activating/deactivating said winding in response to said operating parameters of said winding and said return bus to dynamically control said energy stored in said storage device and in said winding.

34. The power converter and control methodology according to claim 33 further including the step of:

dynamically controlling said return bus in response to the operating parameters of said winding and said return bus to dynamically switch between voltage levels across said winding.

35. The power converter and control methodology according to claim 33 wherein said step of providing further includes the step of:

employing a capacitor as said storage device.

36. The power converter and control methodology according to claim 35 wherein said step of employing further includes the step of:

employing a relatively small size capacitor as said storage device.

37. The power converter and control methodology according to claim 33 wherein said step of dynamically controlling further includes the step of:

dynamically controlling said energy stored in said storage device to a voltage level higher than said supply bus.

38. The power converter and control methodology according to claim 33 wherein said step of dynamically controlling further includes the step of:

dynamically controlling said energy stored in said storage device to a voltage level lower than a predetermined value.

39. The power converter and control methodology according to claim 33 wherein said step of dynamically controlling further includes the step of:

dynamically controlling said energy stored in said storage device by operating said power converter as a boost inverter.

40. A power converter and control system for a motor having an inductive load, said system comprising:

a power converter having a supply bus electrically coupled to said inductive load, said supply bus supplying energy to said inductive load, said power converter having a return bus electrically coupled to said inductive load, said return bus electrically coupled to a storage device for storing energy; and a controller provides control signals to said power converter, said control signals dynamically activate/deactivate said storage device and dynamically activate/deactivate said return bus.

41. A power converter and control methodology for a motor having an inductive load, said methodology comprising the steps of:

providing a power converter having a supply bus electrically coupled to a first end of said inductive load and a common bus electrically coupled to a second end of said inductive load, said supply bus supplying energy to said inductive load according to a control signal received by an energization switch, said power converter having a return bus, said return bus having a storage device for storing energy and a return bus switch which receives a second control signal; and dynamically activating/deactivating both said inductive load and said return bus.

* * * * *

UNITED STATES PATENT AND TRADEMARK OFFICE
CERTIFICATE OF CORRECTION

PATENT NO.   :   5,703,456
DATED        :   December 30, 1997
INVENTOR(S)  :   Karmen D. Cox It is certified that error appears in the above-identified patent and that said Letters Patent is hereby corrected as shown below:

In claim 11, column 23, line 14, before "provides" and following "controller", please insert --that--.

In claim 40, column 26, line 28, before "provides" and following "controller", please insert --that--.

On the title page, in the section labeled "References Cited", in the section labeled "U.S. PATENT DOCUMENTS", please insert
--5,424,624   6/1995   Senak, Jr. ............................318/701--.

On the title page, in the section labeled "References Cited", in the section labeled "FOREIGN PATENT DOCUMENTS", please insert
--2275836A   9/1994   United Kingdom
  2167914A   7/1986   United Kingdom
  2159672A   12/1985  United Kingdom--.

Signed and Sealed this

Twenty-eighth Day of April, 1998

Attest:

BRUCE LEHMAN

*Attesting Officer*   *Commissioner of Patents and Trademarks*